United States Patent [19]

Ozawa

[11] Patent Number: 4,781,447
[45] Date of Patent: Nov. 1, 1988

[54] ULTRA COMPACT ZOOM LENS

[75] Inventor: Toshiro Ozawa, Kawasaki, Japan

[73] Assignee: Ricoh Company, Ltd., Tokyo, Japan

[21] Appl. No.: 110,359

[22] Filed: Oct. 20, 1987

[30] Foreign Application Priority Data

Oct. 22, 1986 [JP] Japan .................................. 61-249748

[51] Int. Cl.$^4$ .......................... G02B 15/16; G02B 9/62
[52] U.S. Cl. ................................................... 350/427
[58] Field of Search ......................................... 350/427

[56] References Cited

U.S. PATENT DOCUMENTS 4,721,371  1/1988  Imai ...................................... 350/427

Primary Examiner—John K. Corbin
Assistant Examiner—Rebecca D. Gass
Attorney, Agent, or Firm—Oblon, Fisher, Spivak, McClelland & Maier

[57] ABSTRACT

An ultra compact zoom lens system includes: a first lens unit having a positive refracting power and including a positive lens, a negative lens and a cemented lens comprised of a negative lens and a positive lens; a second lens unit having a negative refracting power and including a positive lens and a negative lens; and a third lens unit having a positive refractive power and including a positive lens. The second lens unit has a paraxial lateral magification which is always larger than unity and the third lens unit is fixed in position. And, the focal distance of the entire system is varied by varying a spacing between the first and second lens units and a spacing between the second and third lens units relative to each other. Selected parameters, such as focal distance, refractive index and dispersion, of selected lenses defining the present zoom lens system should have values within predetermined ranges so as to provide an ultra compact zoom lens system which provides an excellent image forming characteristic over the entire zooming range and which has a large zoom ratio.

6 Claims, 35 Drawing Sheets

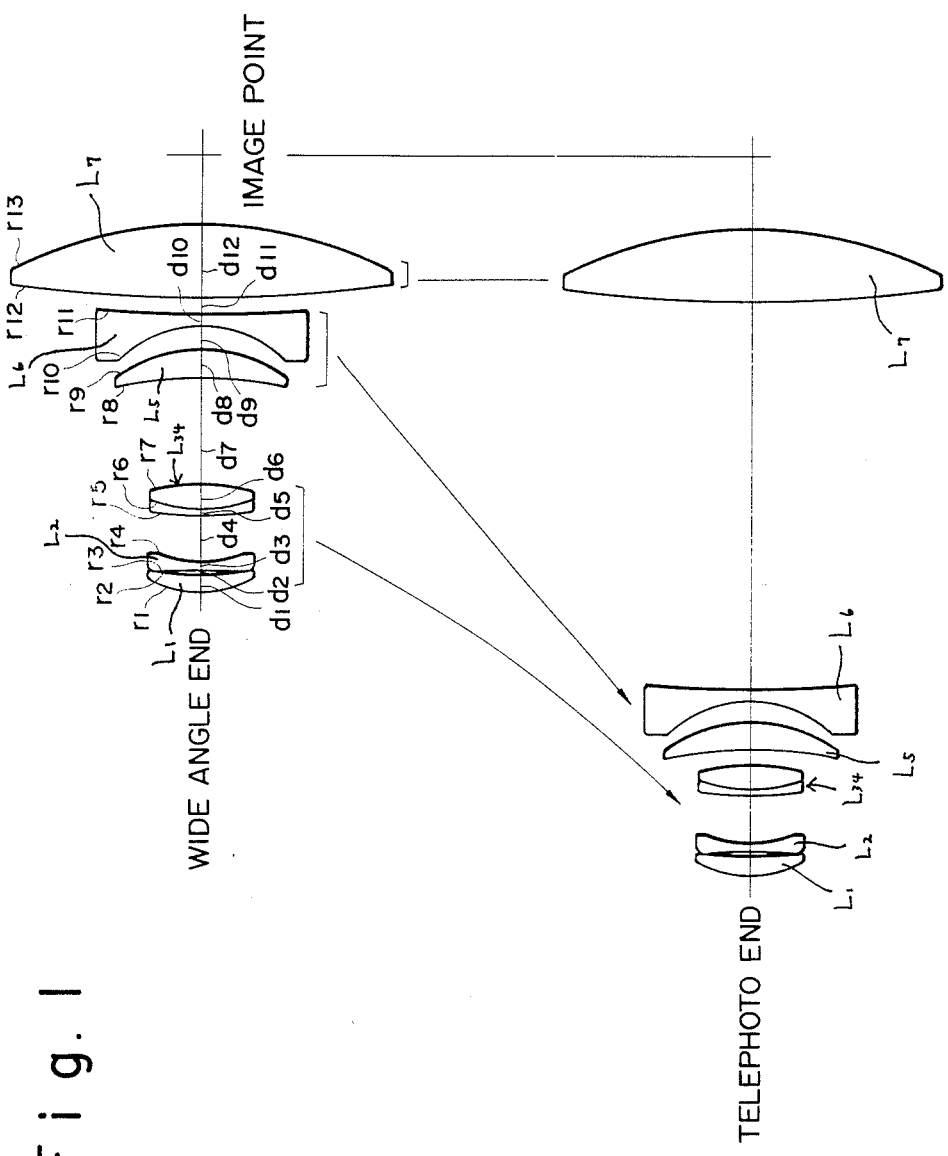

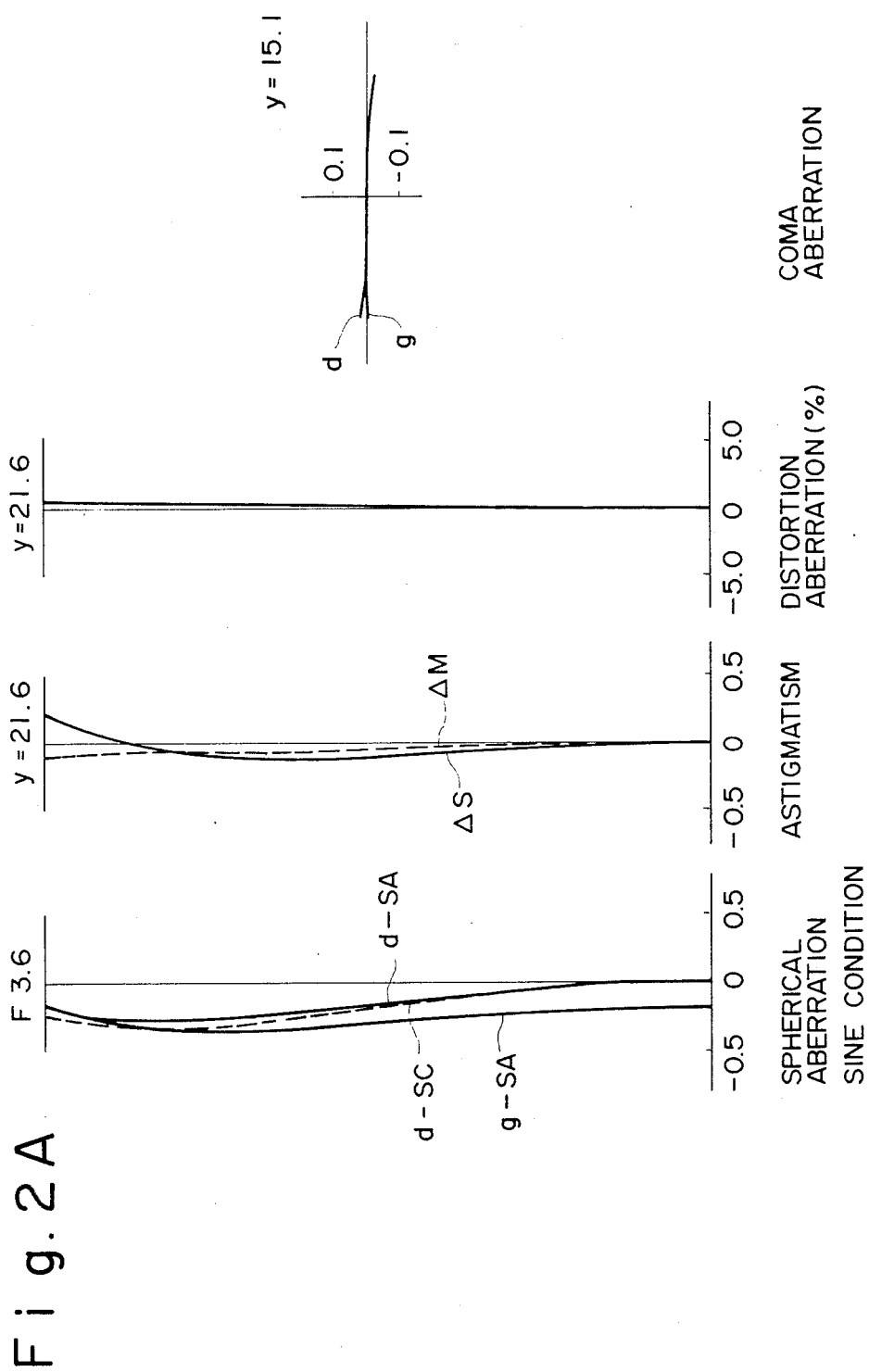

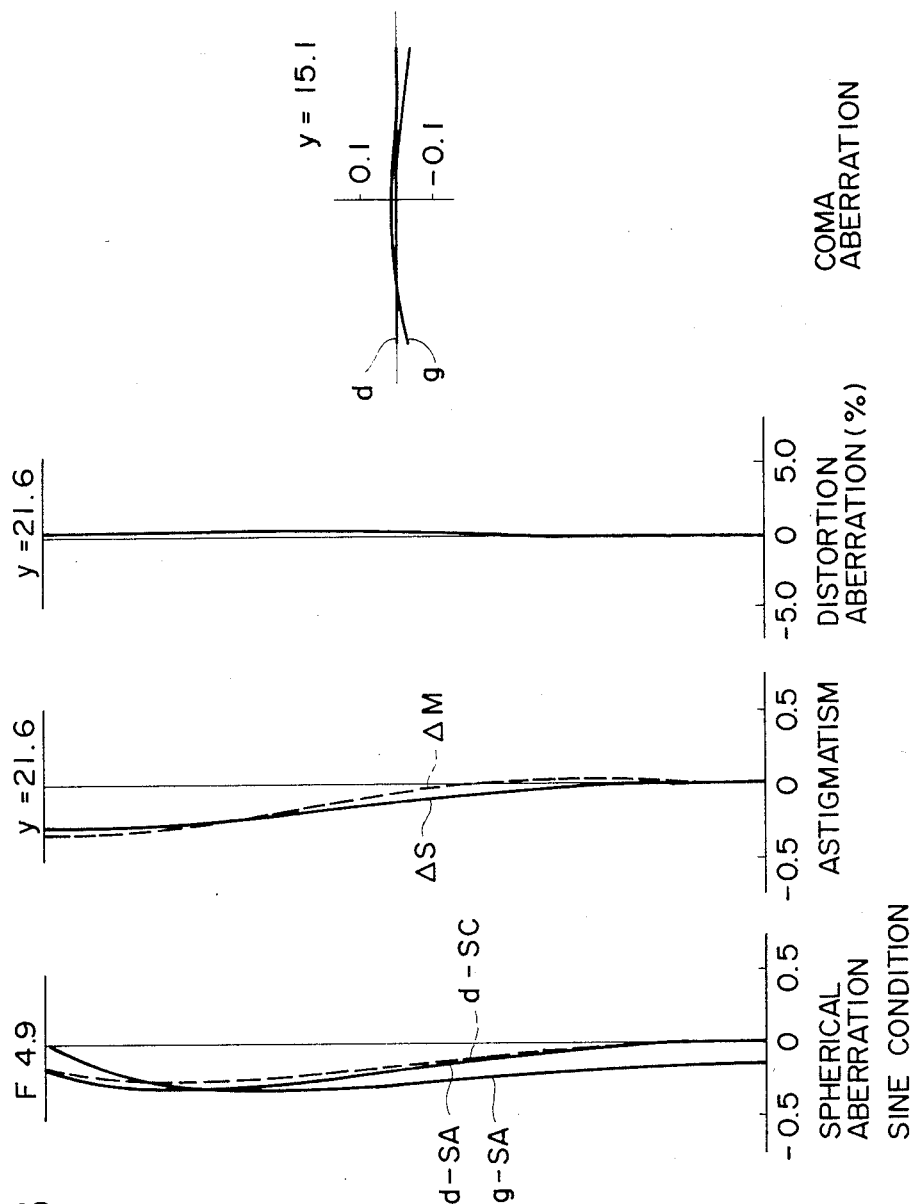

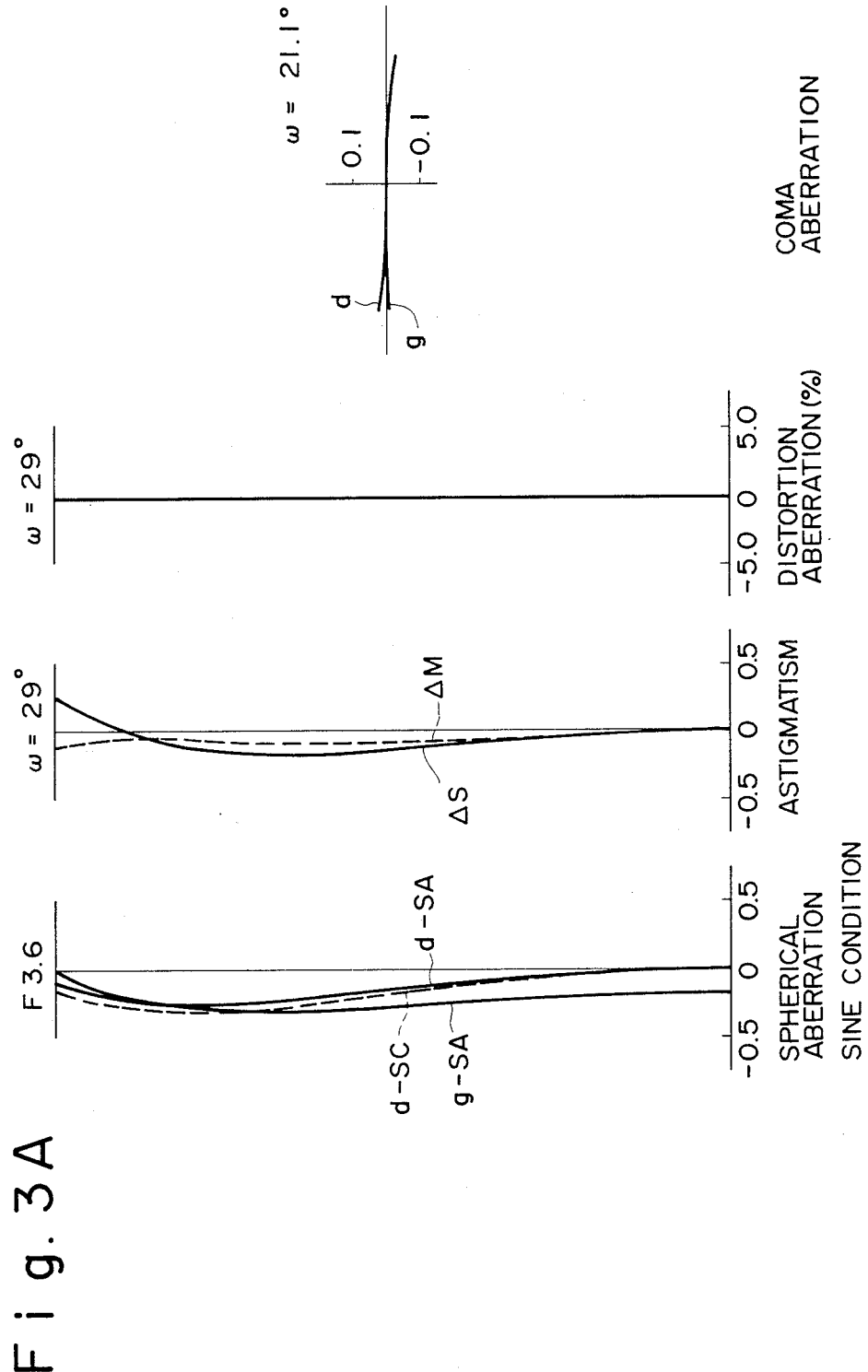

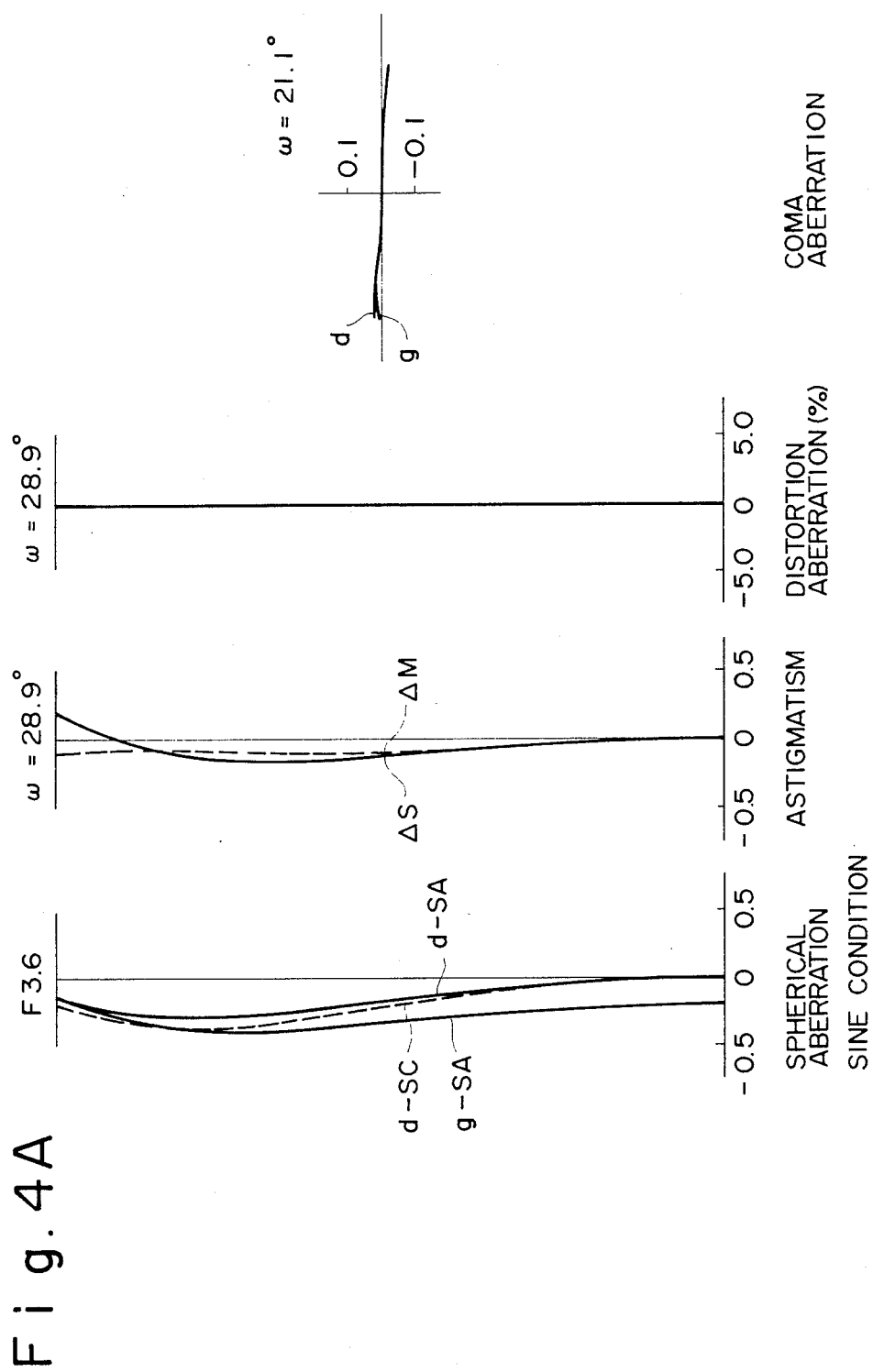

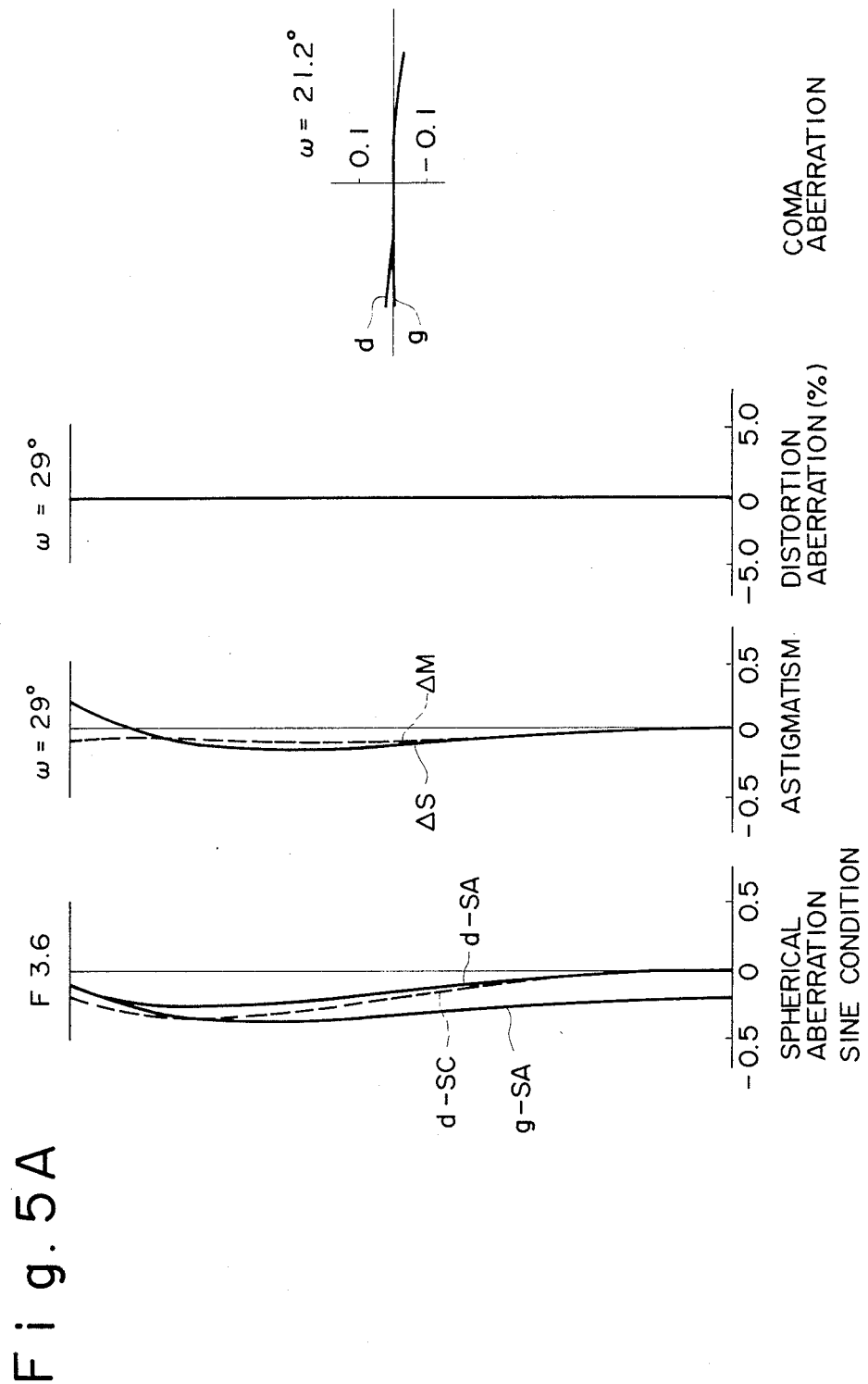

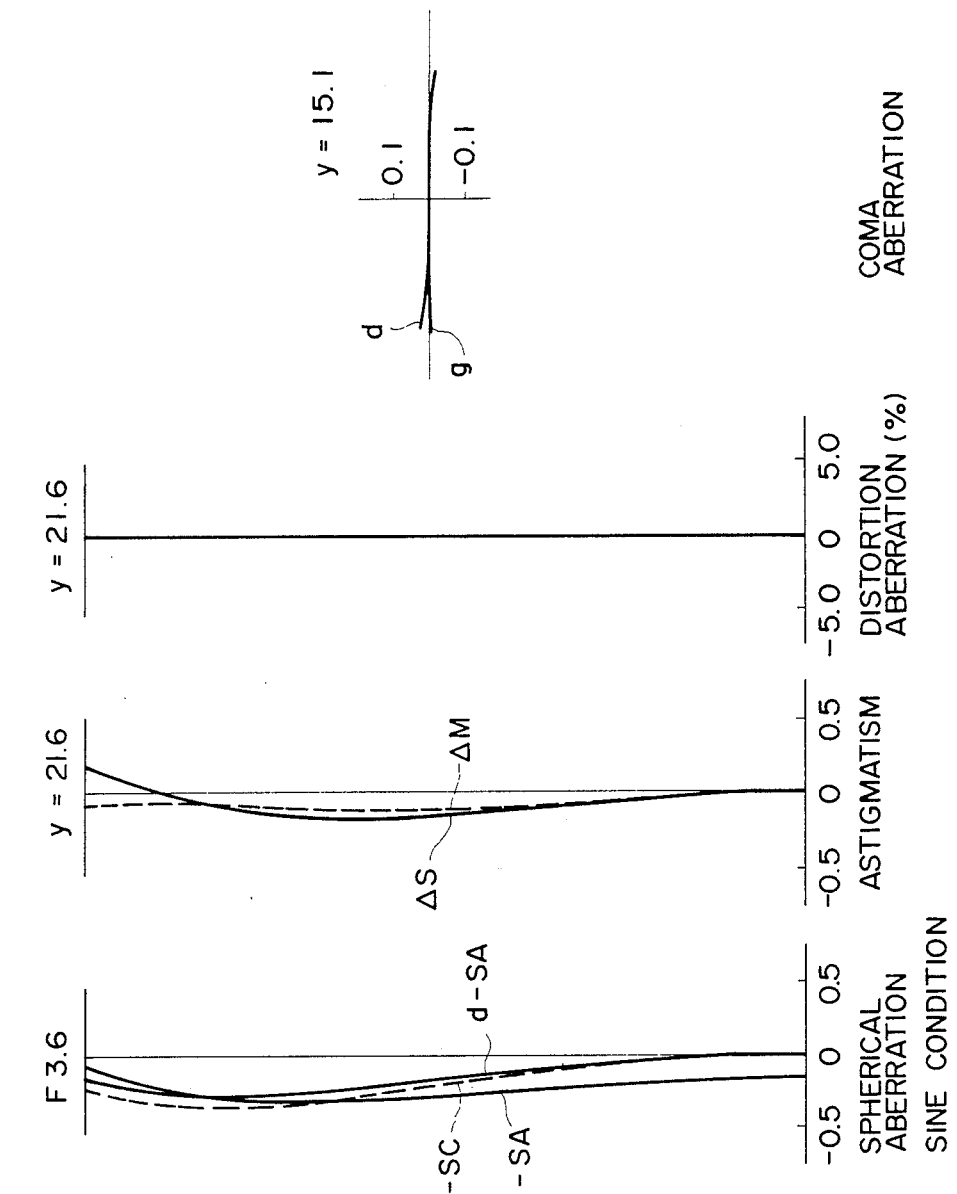

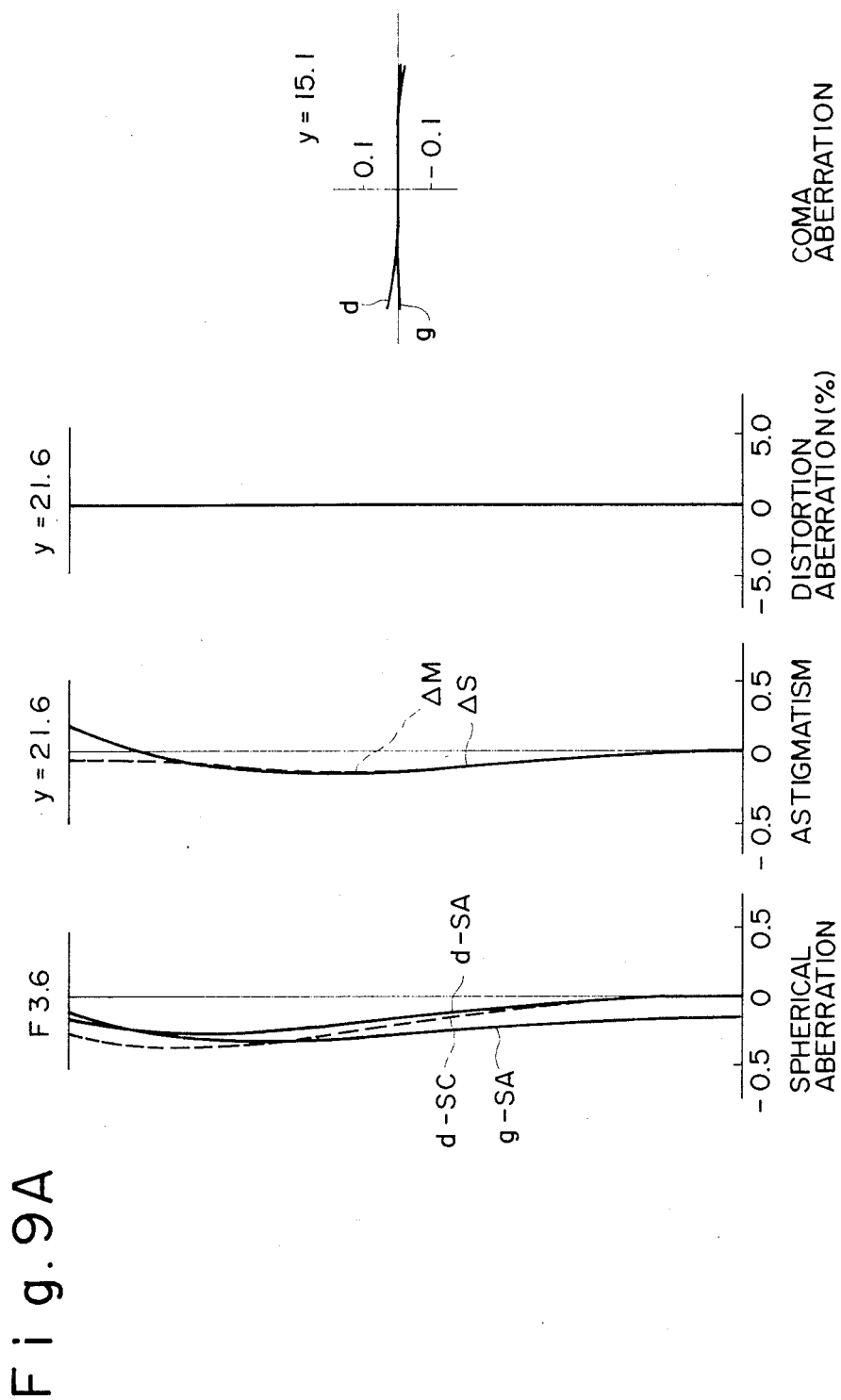

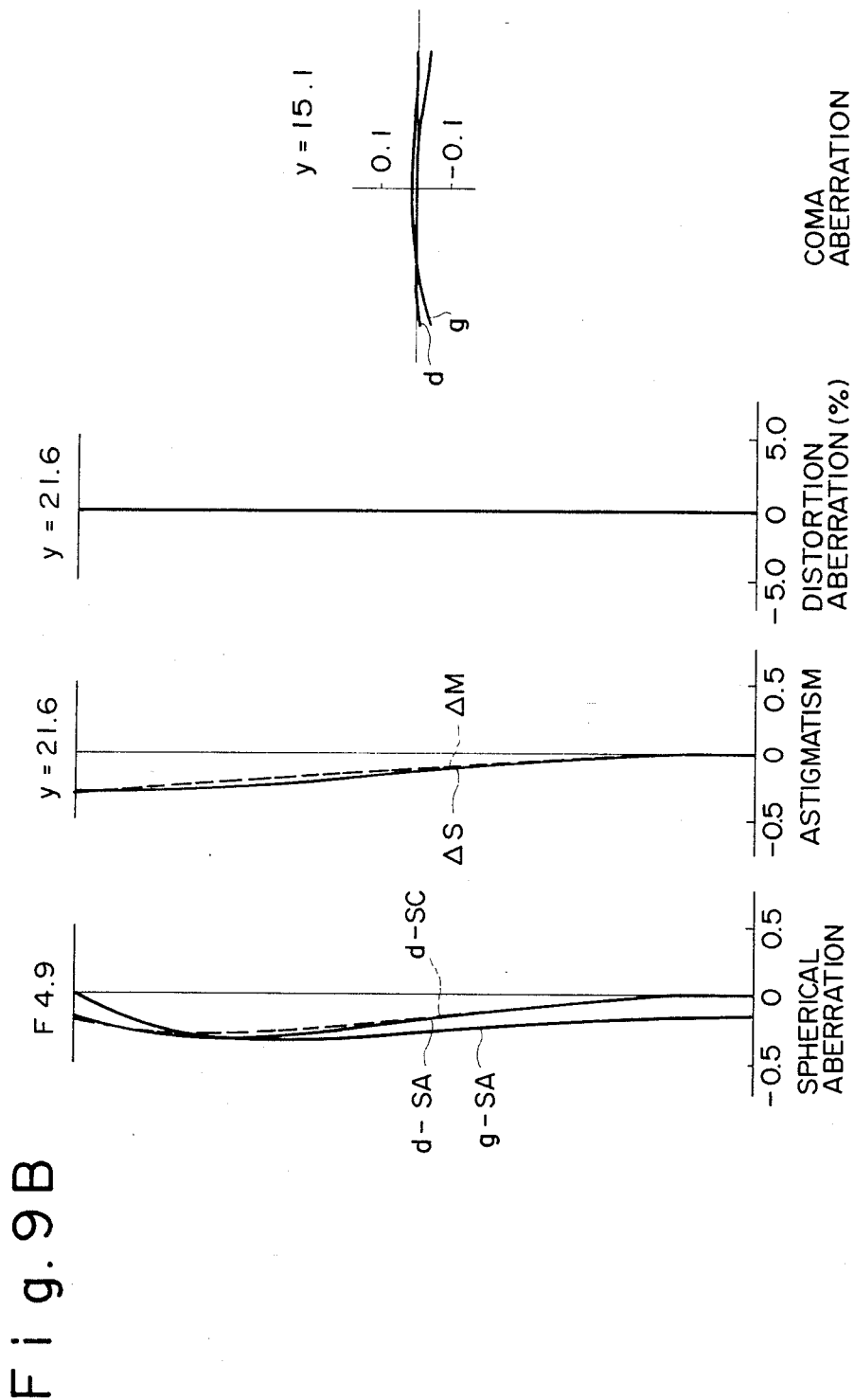

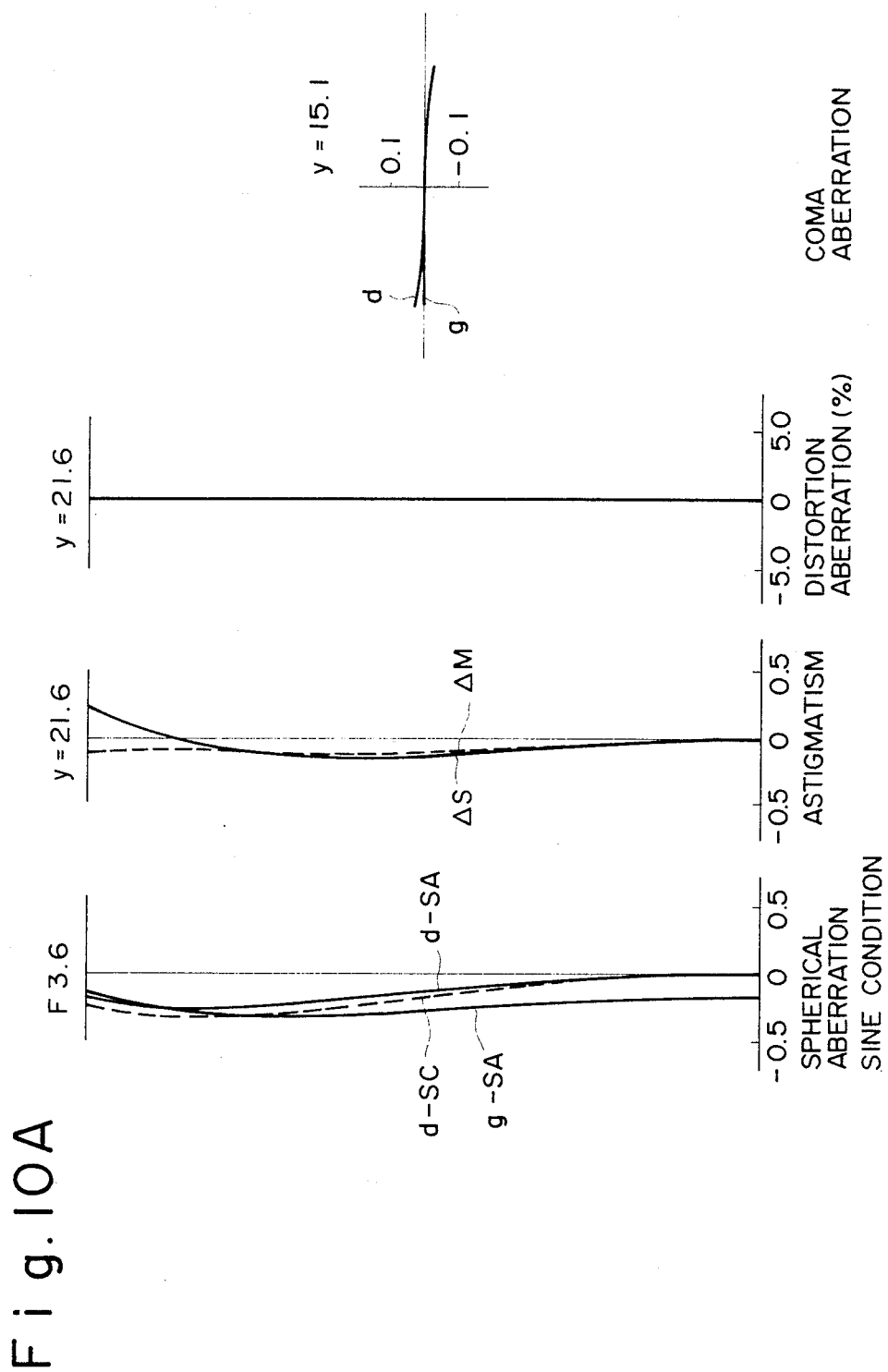

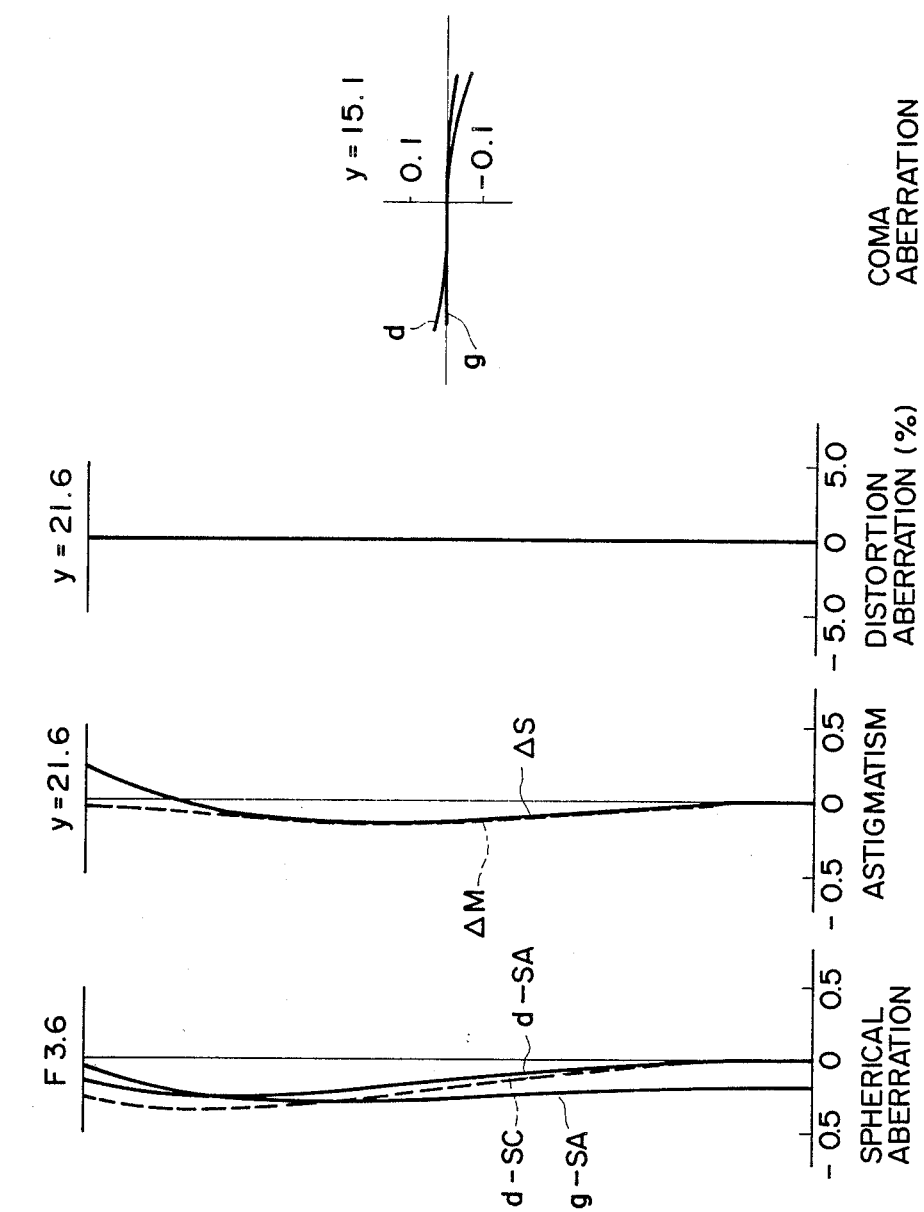

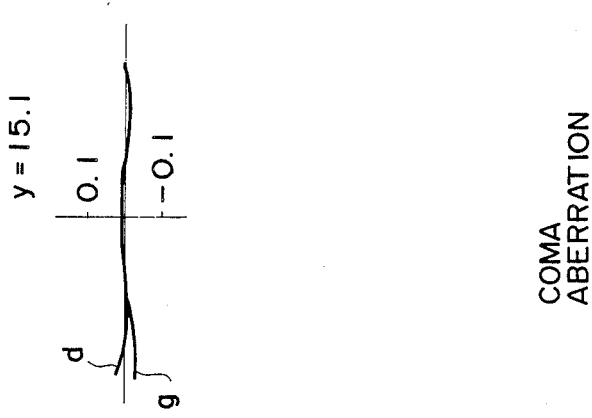
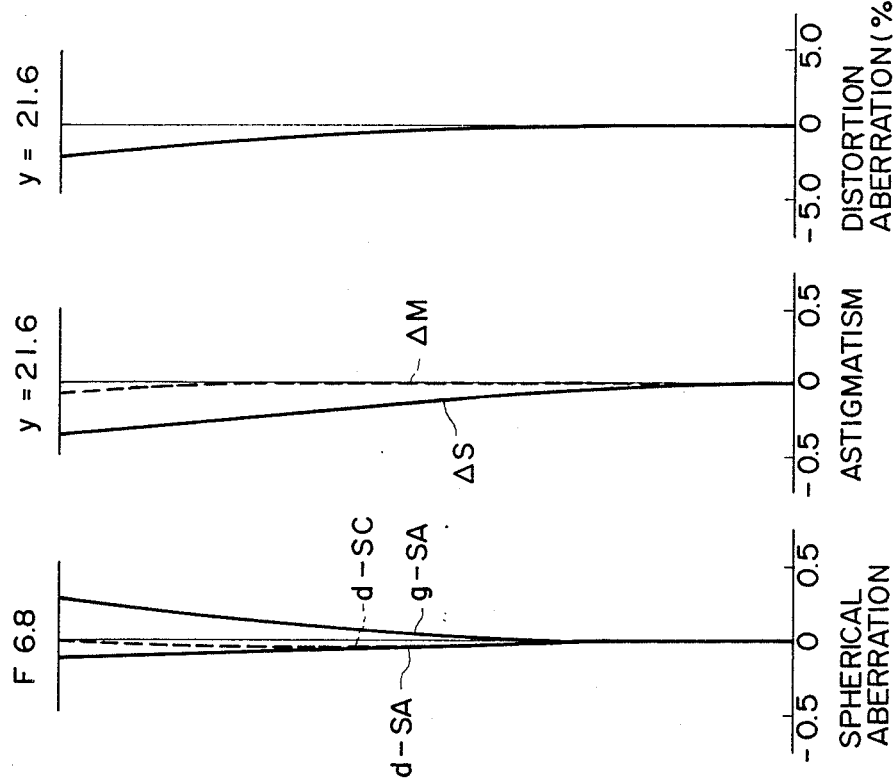
Fig.13C

ULTRA COMPACT ZOOM LENS

BACKGROUND OF THE INVENTION

1. Field of the Invention

This invention generally relates to a zoom lens, and, in particular, to a ultra compact zoom lens whose distance between the front surface of its front lens and an image point is extremely small.

2. Description of the Prior Art

Recently, even in a compact camera using a lens shutter, a bifocal camera capable of switching between the quasi-wide angle mode and the telepscopic mode has become a main stream. Besides, there is a growing demand for a compact camera equipped with a zoom lens which allows to change the focal distance continuously and not just between the two fixed focal distances as in the bifocal camera. Moreover, although a zoom lens has been used with a video camera, there has been a new demand for a zoom lens more compact in size because of the advent of an 8-mm video camera. In order to meet with these new demands, there must be provided a zoom lens which does not have a relatively long back focal length, which was usually the case with the prior art single reflex cameras, and whose distance between the front surface of the front lens and an image point is extremely small.

Under the circumstances, the present inventor has previously proposed an ultra compact zoom lens including first, second and third lens units having positive, negative and positive refracting powers, respectively, from the front to the rear with the paraxial lateral magnification of the second lens unit being always larger than unity and the third lens unit being fixed in position, whereby the magnification is varied by varying the distances among the lens units by moving the first and second lens units, as disclosed in the Japanese Patent Application No. 61-28890 assigned to the assignee of this application, which is hereby incorporated by reference. This proposed zoom lens has the telephoto ratio in the order of 1.2 to 1.07 and the diameter of its front lens is relatively smaller, thereby allowing to make the entire structure compact in size. In addition, despite its compactness, it has an excellent image forming characteristic over the entire zooming range. However, the zoom ratio cannot be increased beyond approximately 1.7.

SUMMARY OF THE INVENTION

In accordance with the principle of the present invention, there is provided a zoom lens which is an improvement over the previously proposed zoom lens disclosed in the above-mentioned application. For this purpose, there is provided a zoom lens system including a first lens unit having a positive refracting power, a second lens unit having a negative refracting power, and a third lens unit having a positive refracting power arranged in the order mentioned from an object side to an image plane side. The paraxial lateral magnification of the second lens unit is always larger than unity and the third lens unit is fixed in position relative to the first and second lens units. And, the focal distance of the system is varied by varying the distance between the first and second lens units and the distance between the second and third lens units relative to each other. The first lens unit includes a positive lens $L_1$, a negative lens $L_2$ and a cemented lens $L_{34}$ formed by cementing a negative lens and a positive lens and having a positive resultant refracting power. The second lens unit includes a positive lens $L_5$ and a negative lens $L_6$. And, the third lens unit includes a positive lens $L_7$. In accordance with the improvement of the present invention, designating the resultant focal distances of the first and second lens units by $f_1$ and $f_2$, respectively; the refractive index of a lens material forming the negative lens $L_6$ by $n_6$; the dispersion of a lens material forming the positive lens $L_1$ by $v_1$; the refractive indexes of materials forming the positive and negative lenses of the cemented lens $L_{34}$ by $n_+$ and $n_-$, respectively; the dispersions of the materials forming the positive and negative lenses of the cemented lens $L_{34}$ by $v_+$ and $v_-$, respectively, the following conditions must be satisfied.

(1) $1.0f_1 < |f_2| < 1.2f_1$
(2) $1.68 < n_+ < n_-$
(3) $20 < v_+ - v_-$
(4) $35 < v_1$
(5) $1.65 < n_6$.

In addition, in the preferred embodiment, designating the radius of curvature of the front surface of the positive lens $L_5$ by $r_9$ and the refractive index of a lens material forming the lens $L_5$ by $n_5$, then the following condition is preferably satisfied.

$$0.8 < \left| \frac{(1 - n_5)}{r_9} f2 \right| < 1.6 \quad (6)$$

It is therefore a primary object of the present invention to provide an ultra compact zoom lens system which is an improvement over the previously proposed zoom lens system disclosed in the prior application indicated above.

Another object of the present invention is to provide an ultra compact zoom lens system suitable for use with a compact camera and/or a compact video camera, such as an 8-mm video camera.

A further object of the present invention is to provide an improved ultra zoom lens system which is extremely small in size, light in weight, high in zoom ratio, simple in structure and excellent in zooming performance.

Other objects, advantages and novel features of the present invention will become apparent from the following detailed description of the invention when considered in conjunction with the accompanying drawings.

BRIEF DESCRIPTION OF THE DRAWINGS

FIG. 1 is a schematic illustration showing a zoom lens system constructed in accordance with one embodiment of the present invention in which the wide angle mode is shown at top and the telephoto mode is shown at bottom;

DESCRIPTION OF THE PREFERRED EMBODIMENTS

Figure 2C:
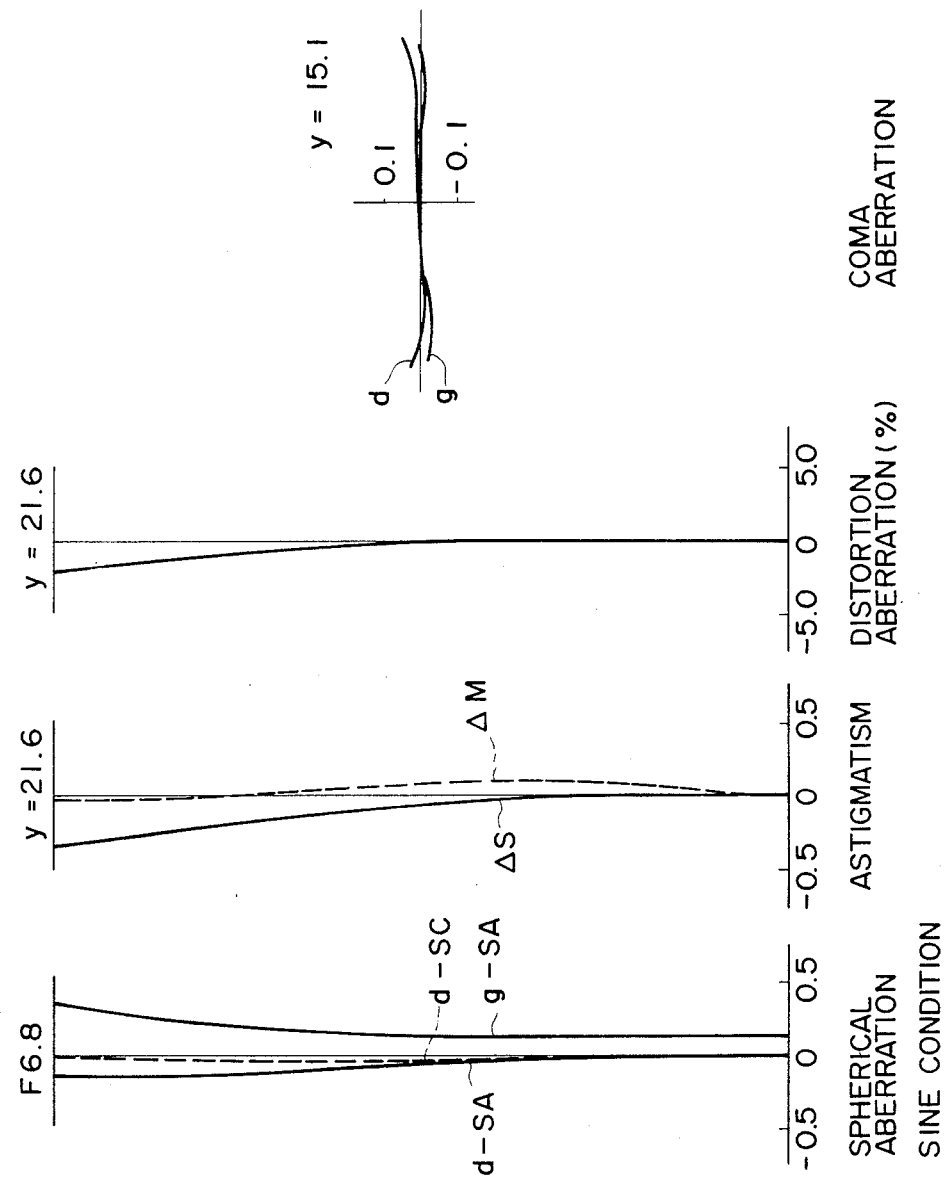
FIGS. 2 through 11 show graphs illustrating the aberration characteristics of Examples 1 through 10 each having the structure shown in FIG. 1, in each graph, A, B and C indicate wide angle end, intermediate focal distance and telephoto end, respectively.
Figure 3B:
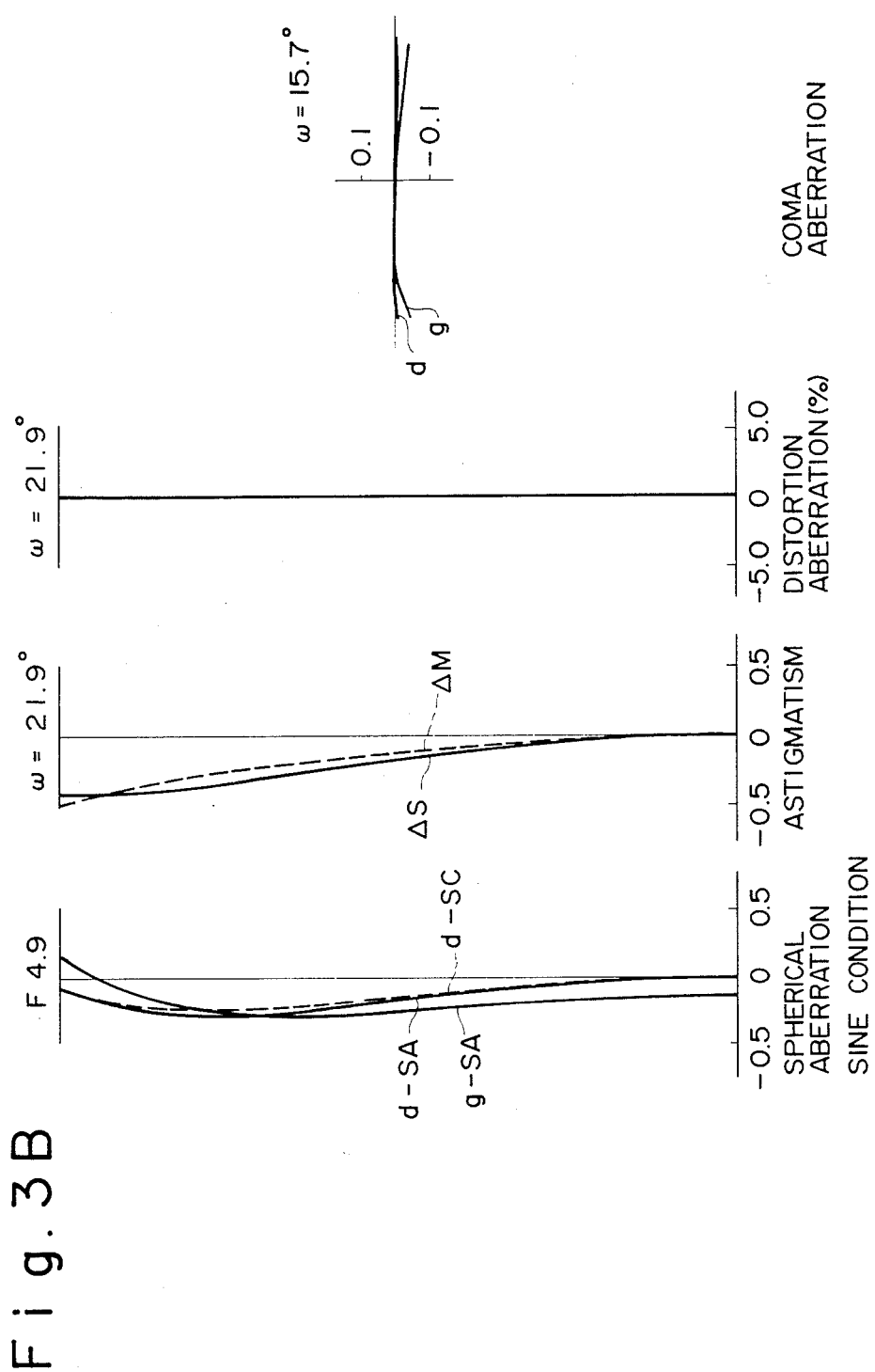
Figure 3C:
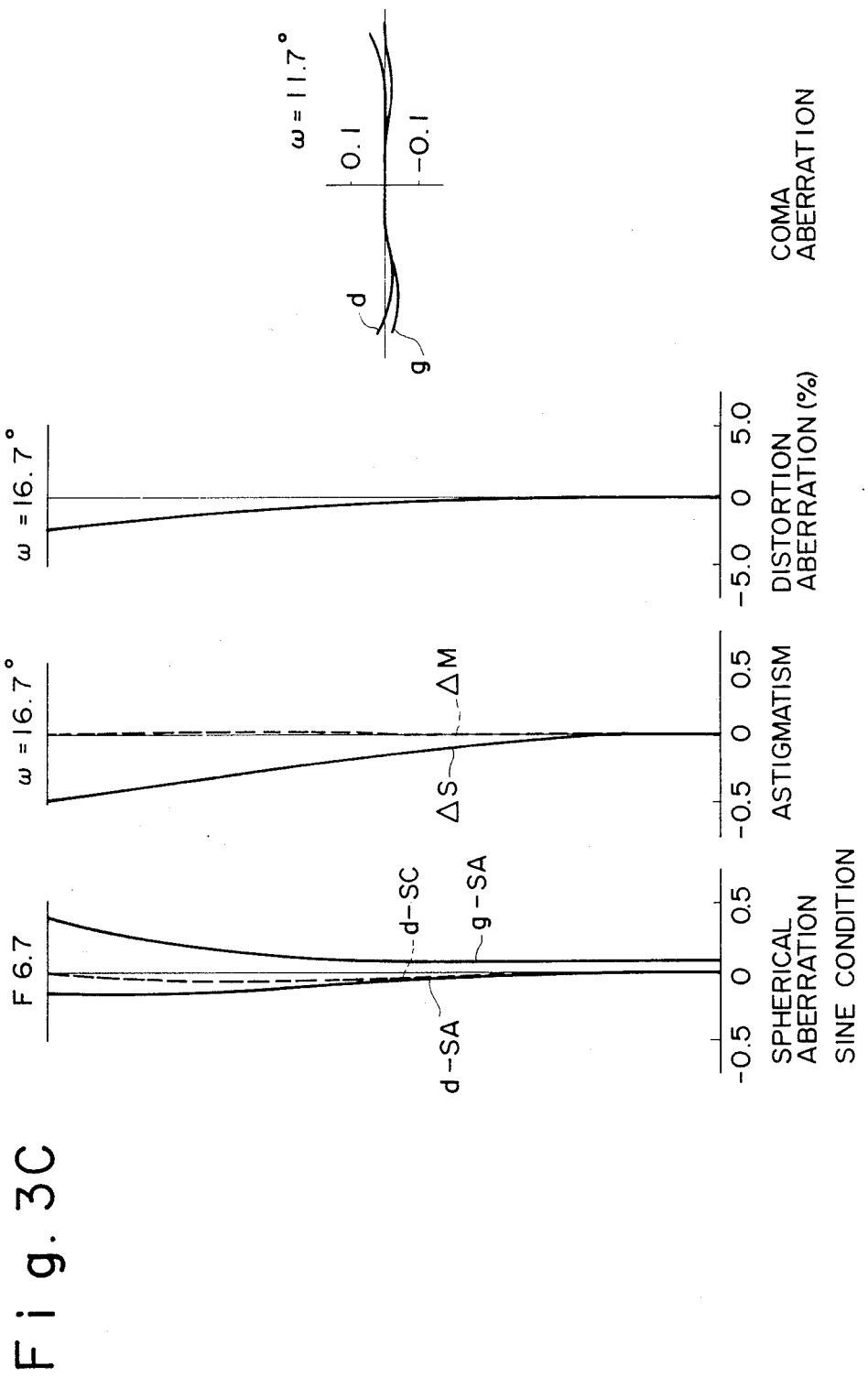
Figure 4B:
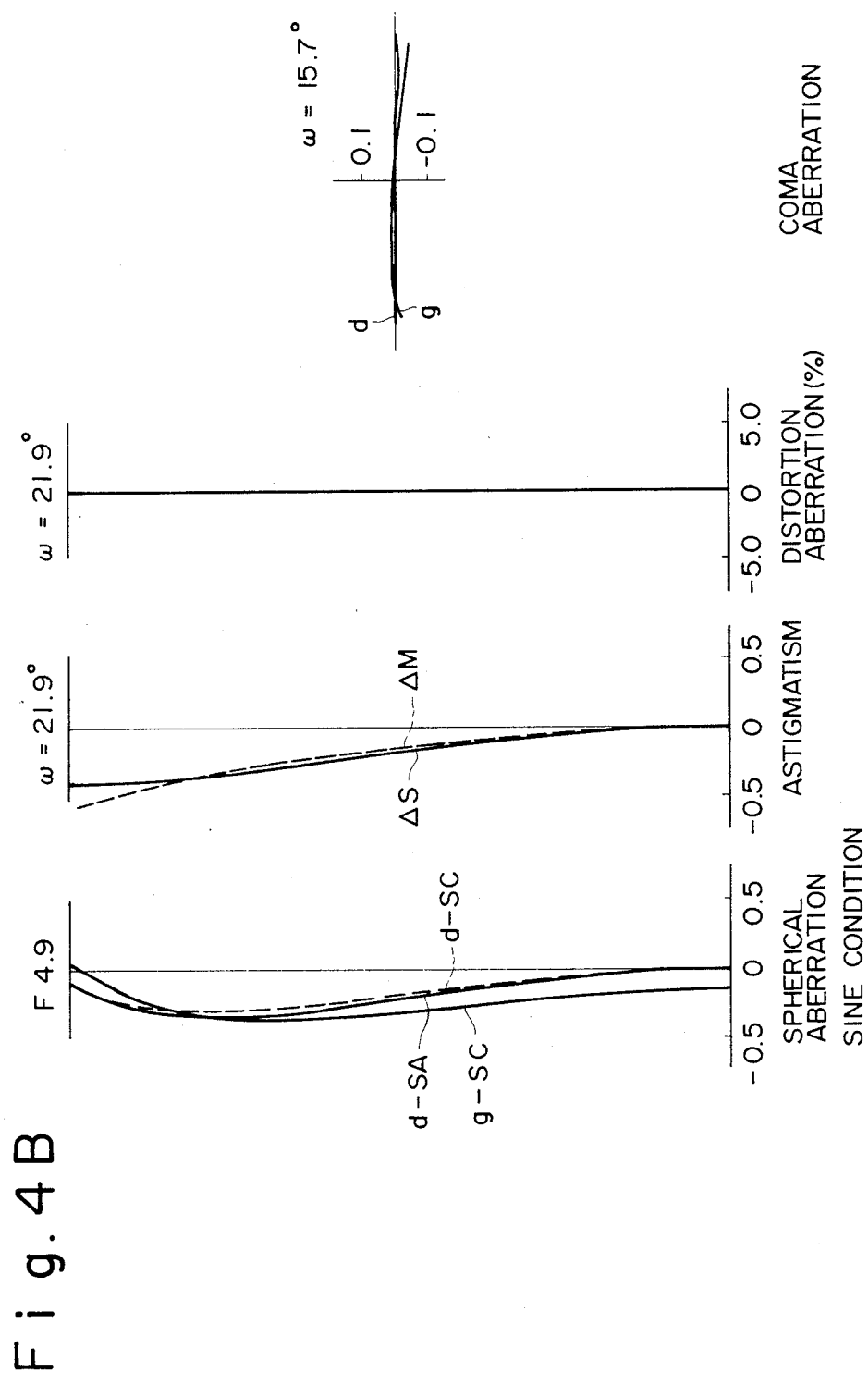
Figure 4C:
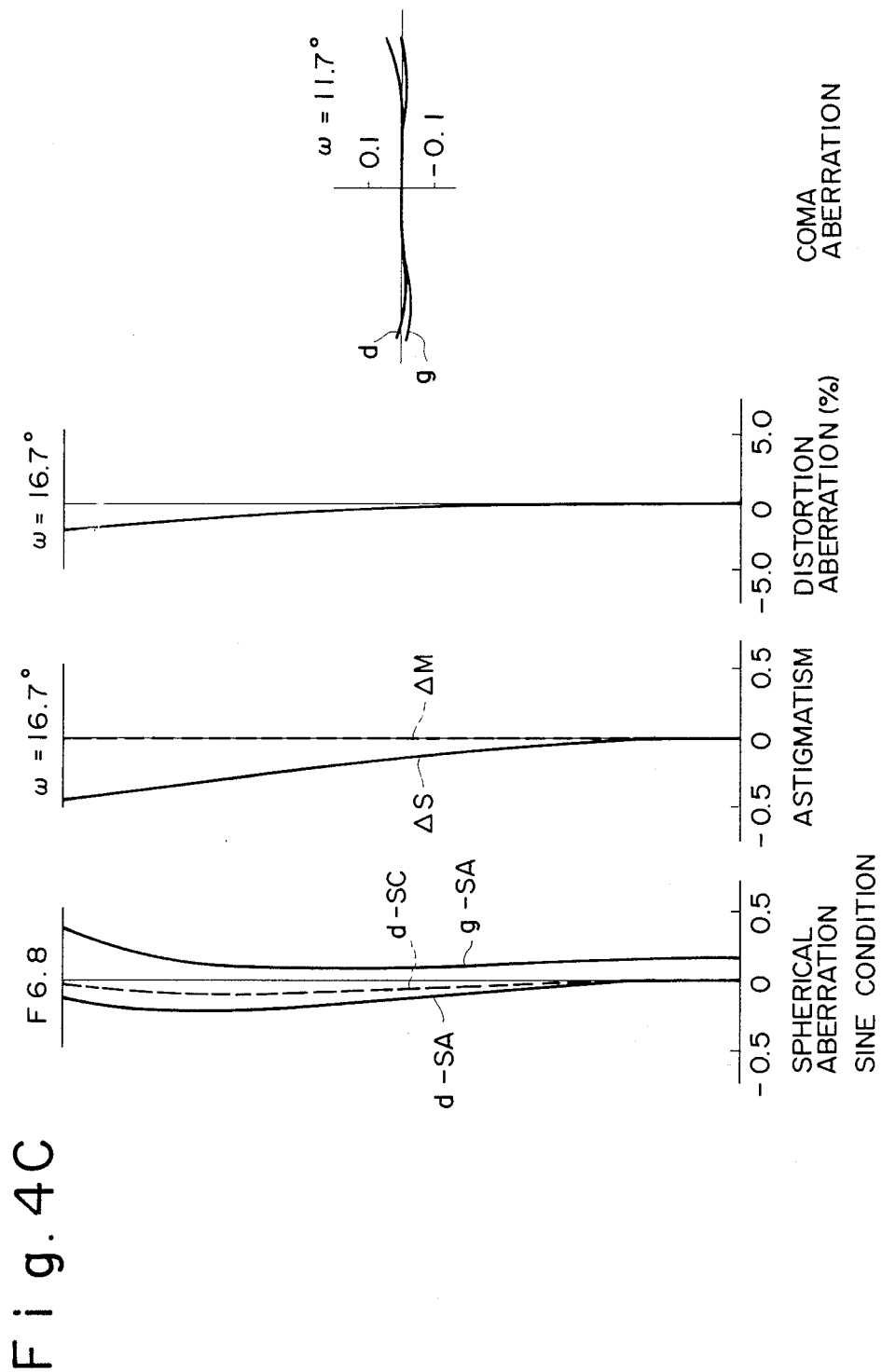
Figure 5B:
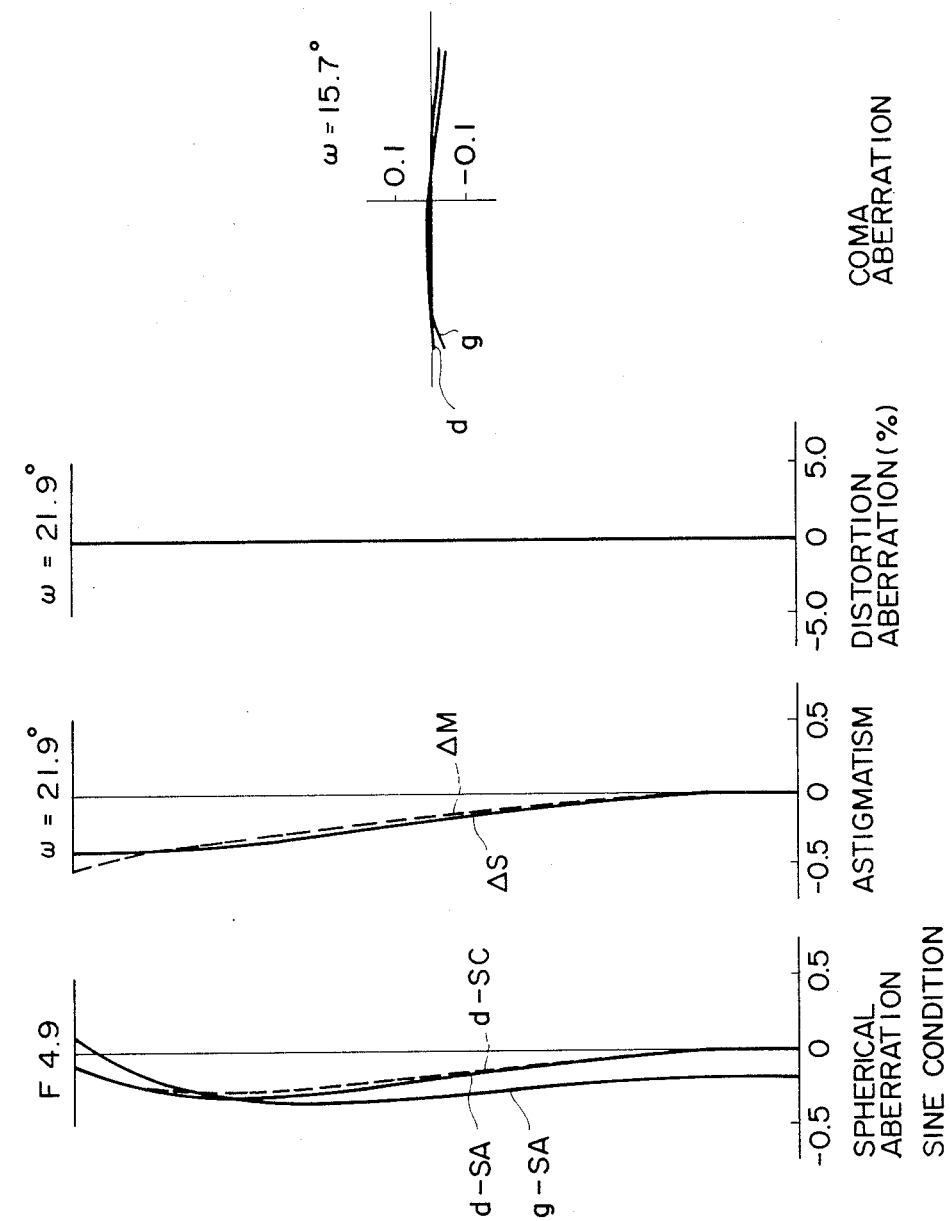
Figure 5C:
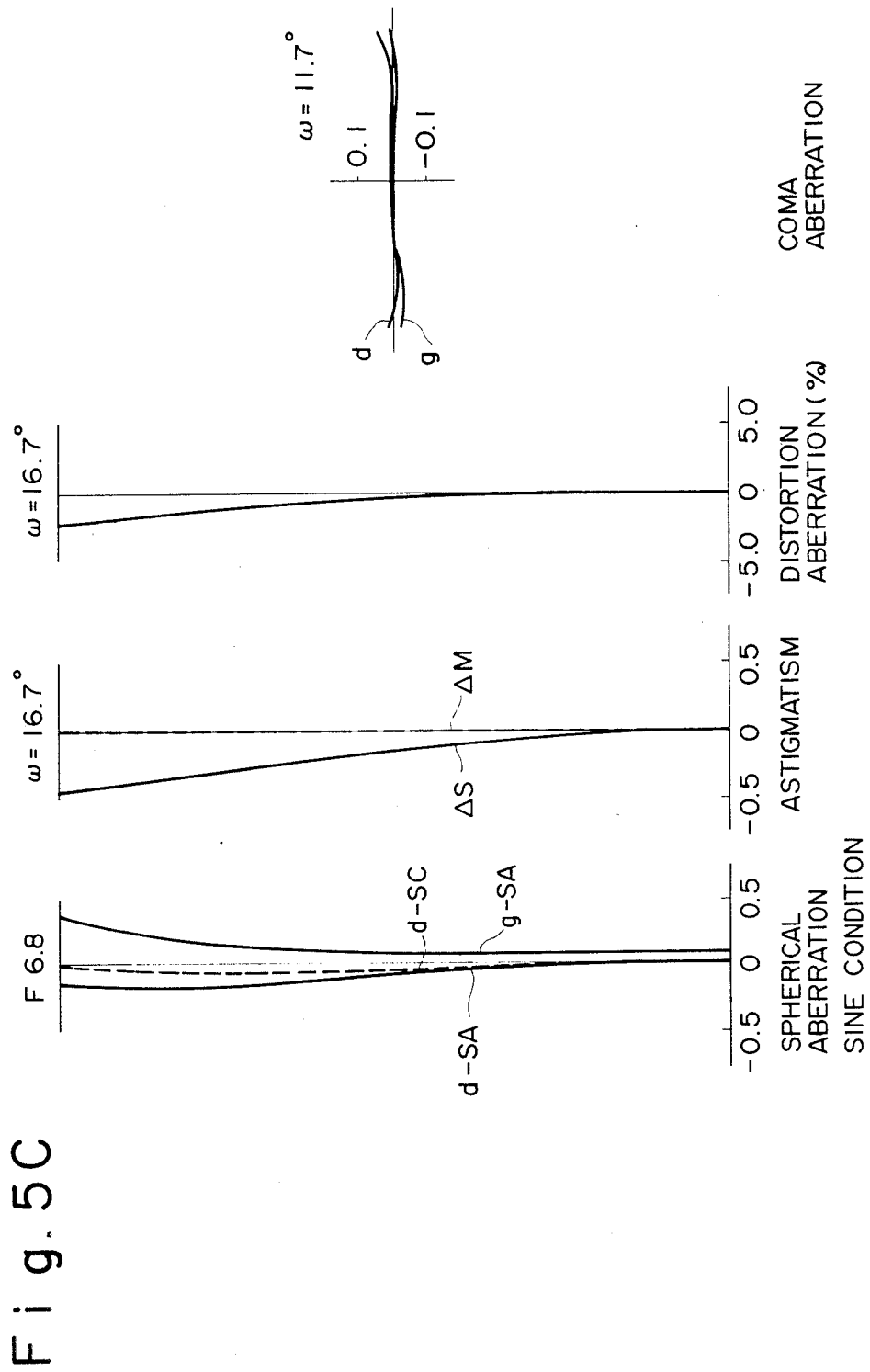
Figure 6A:
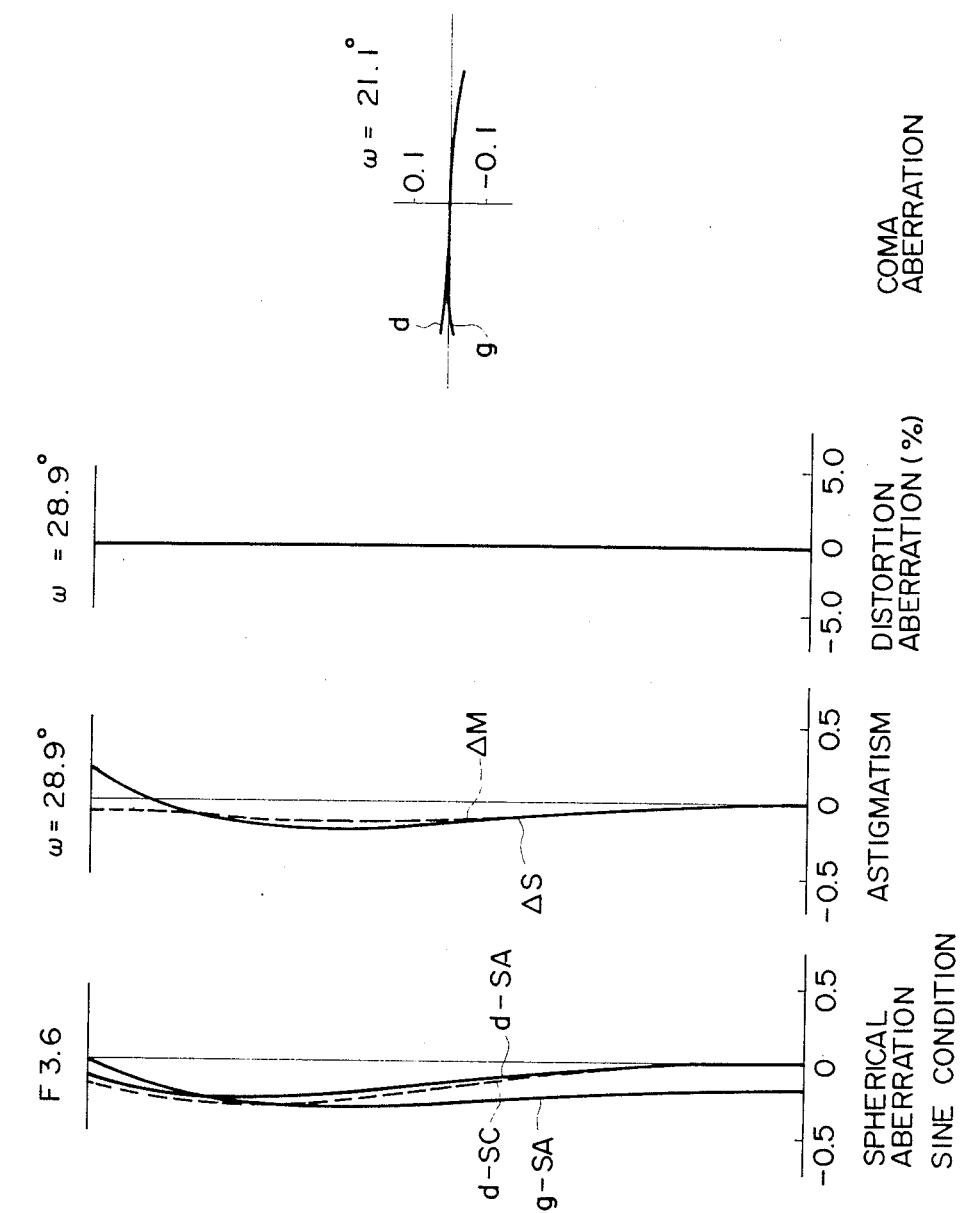
Figure 6B:
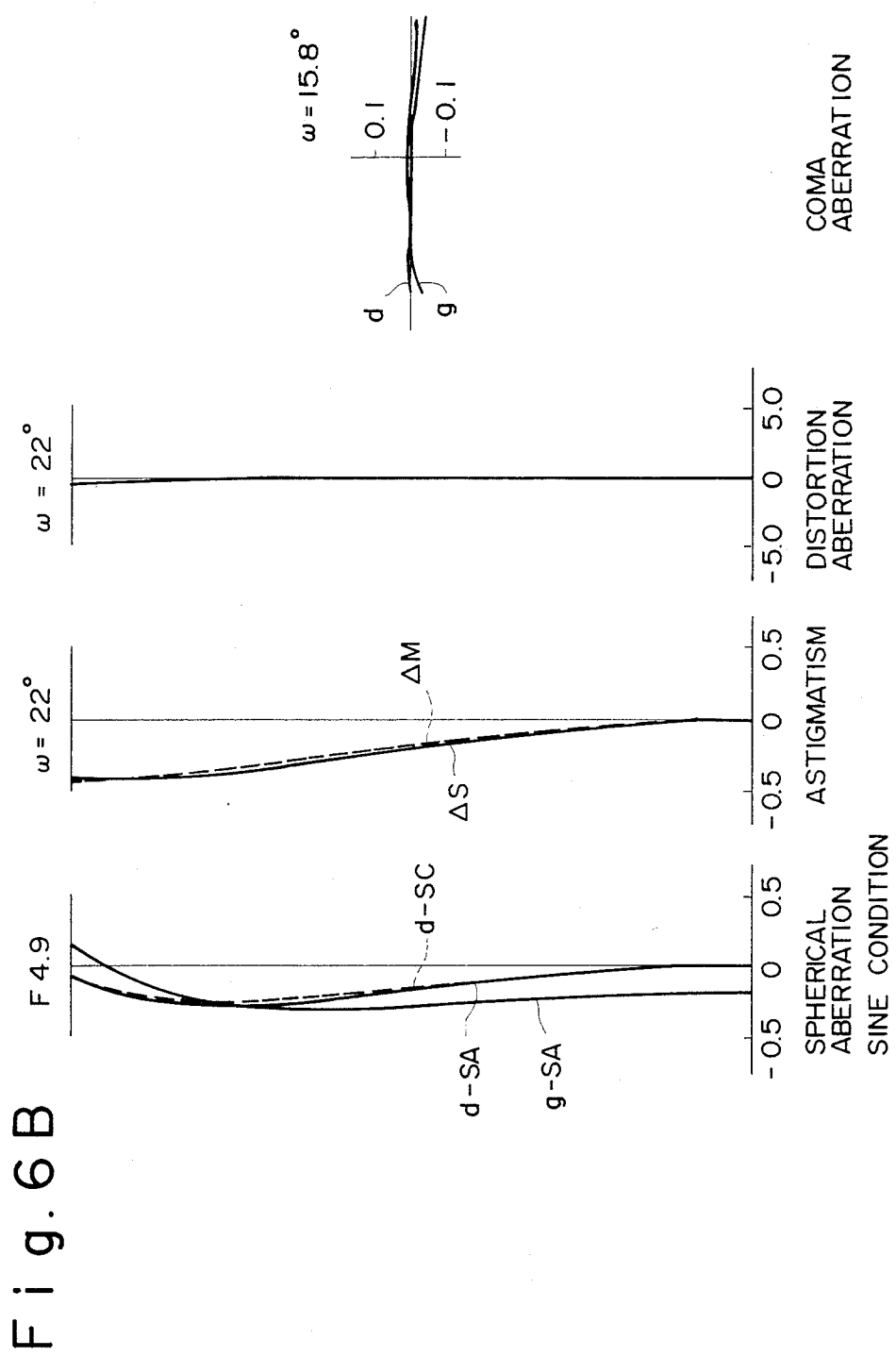
Figure 6C:
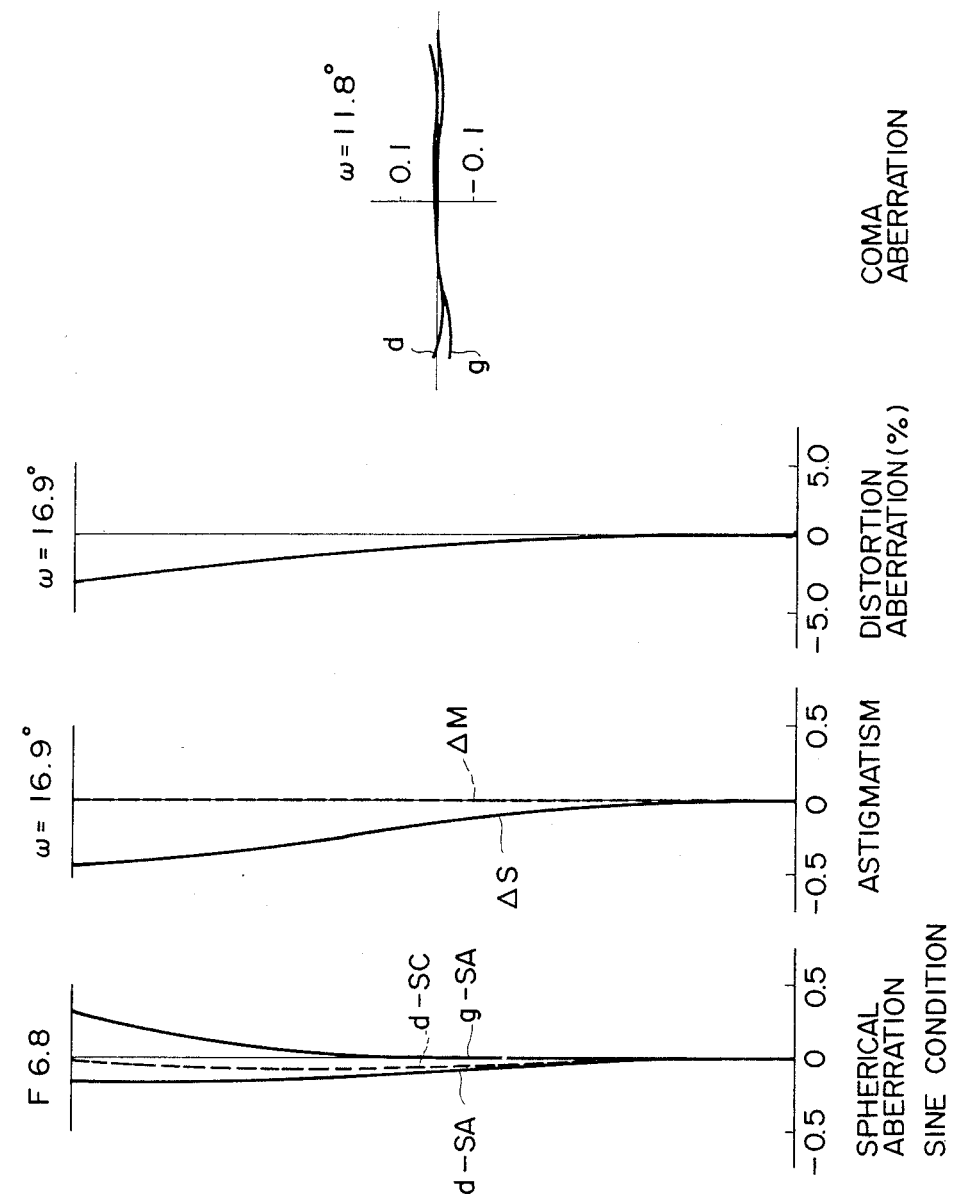
Figure 7A:
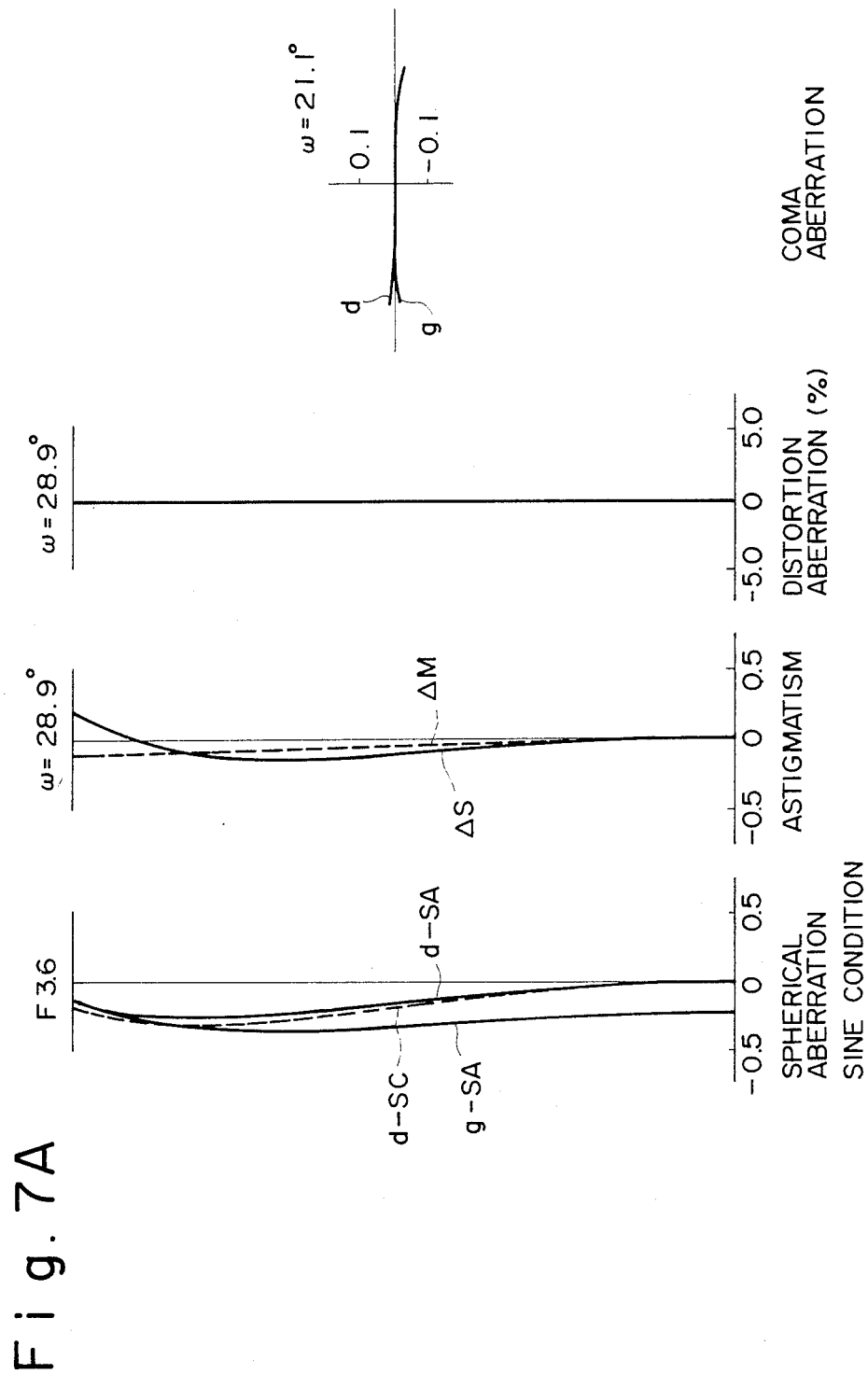
Figure 7B:
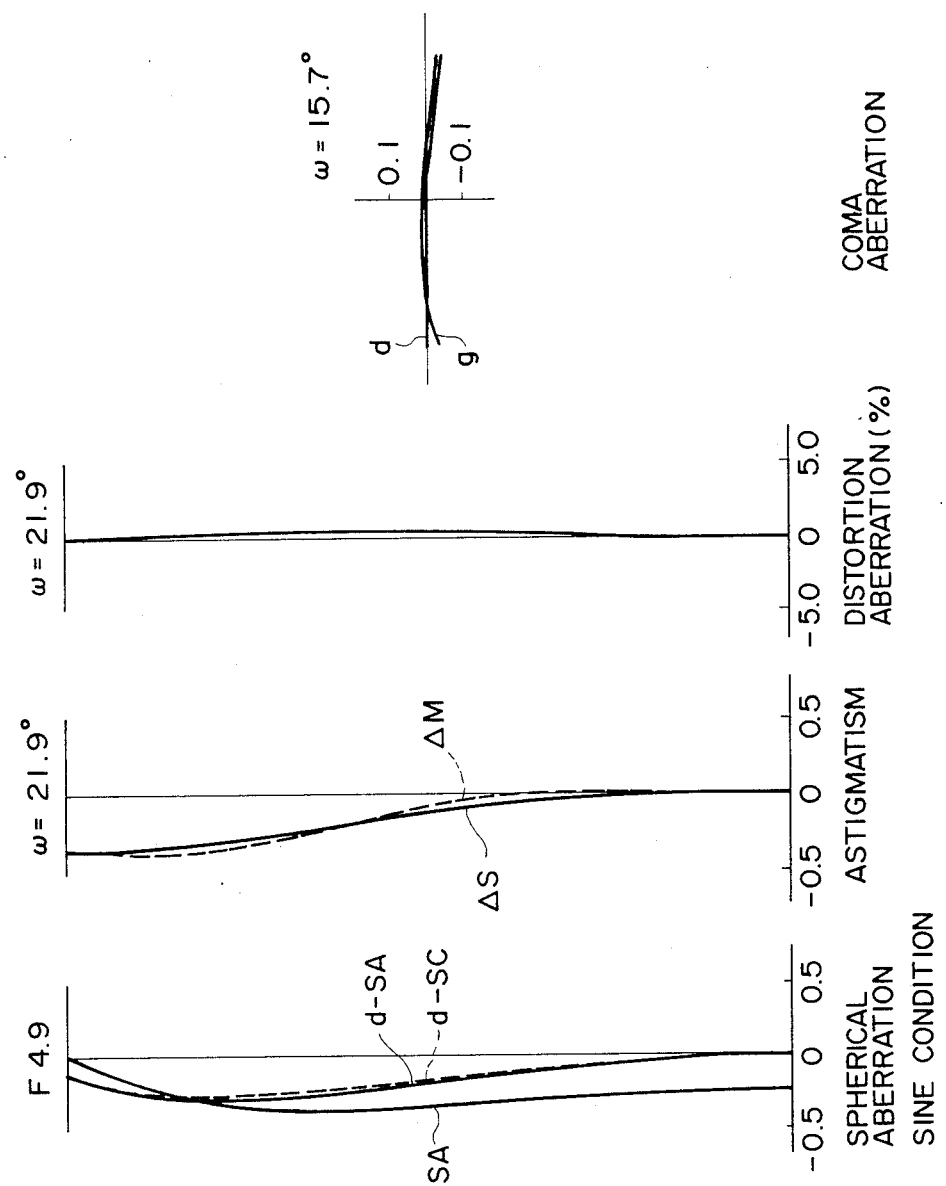
Figure 7C:
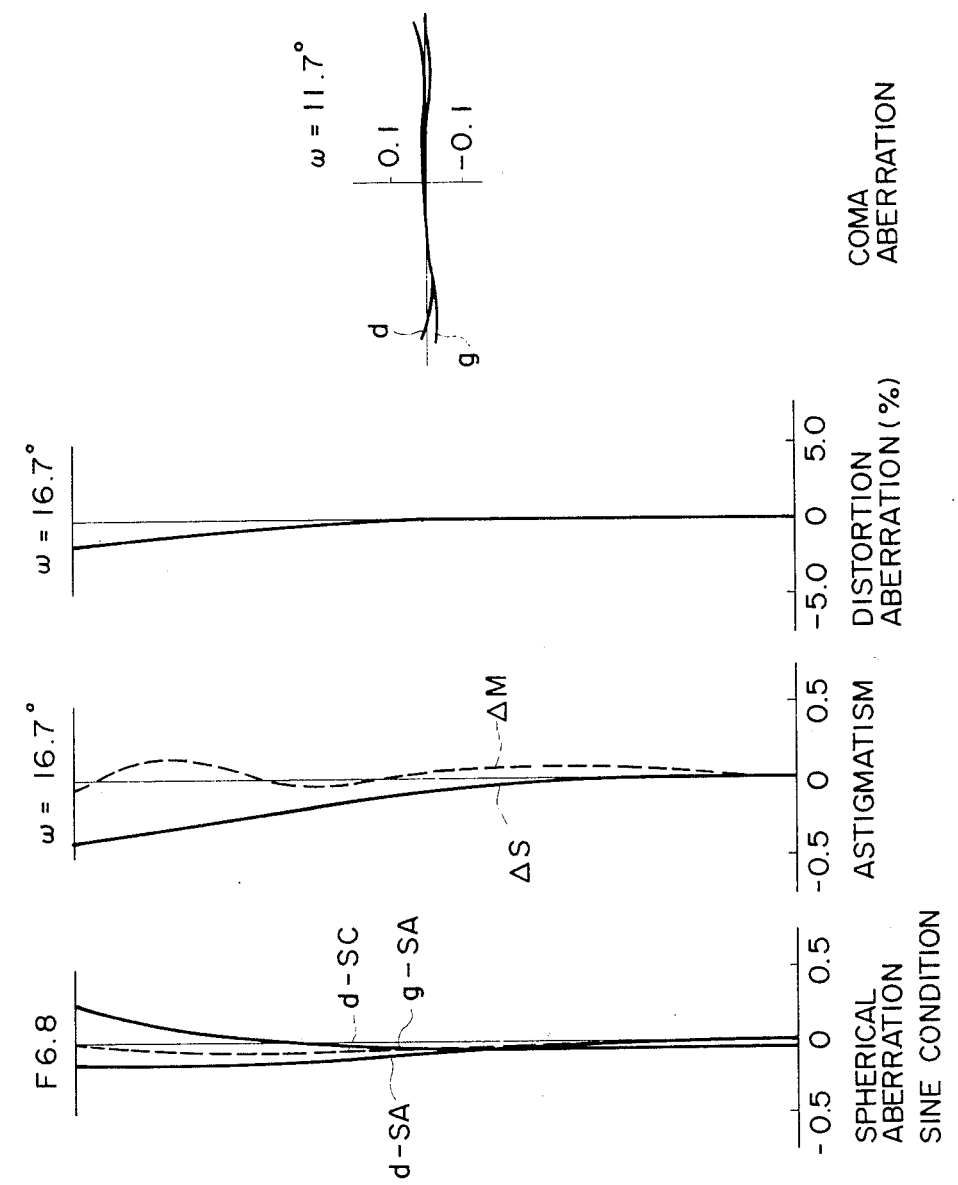
Figure 8B:
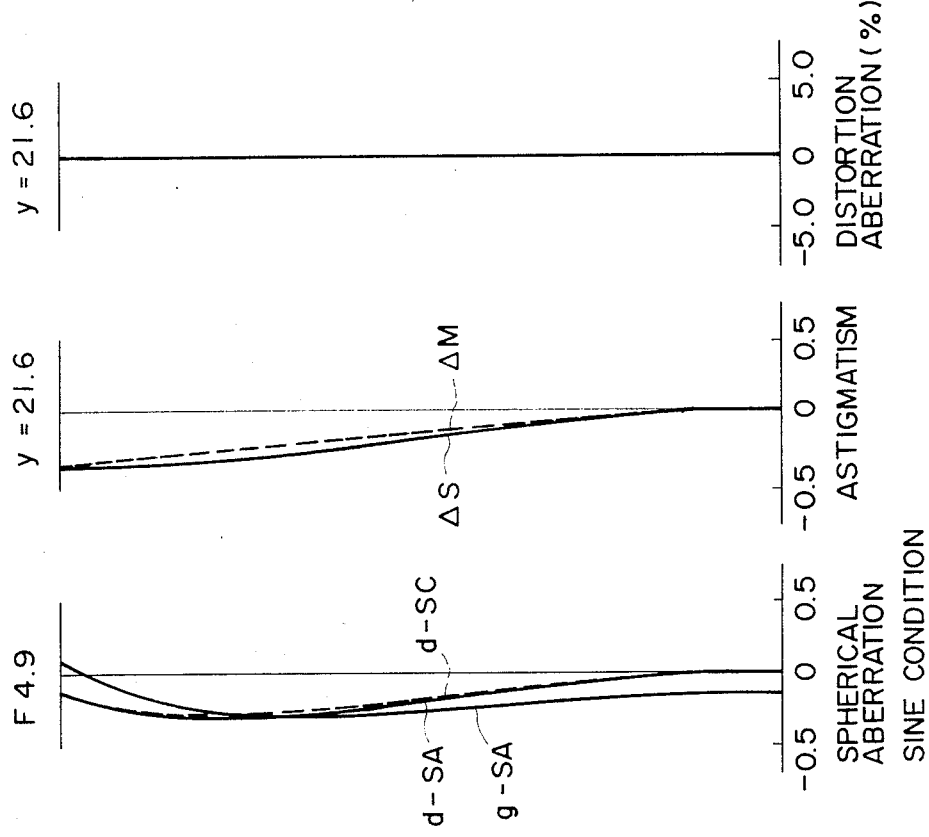
Figure 8C:
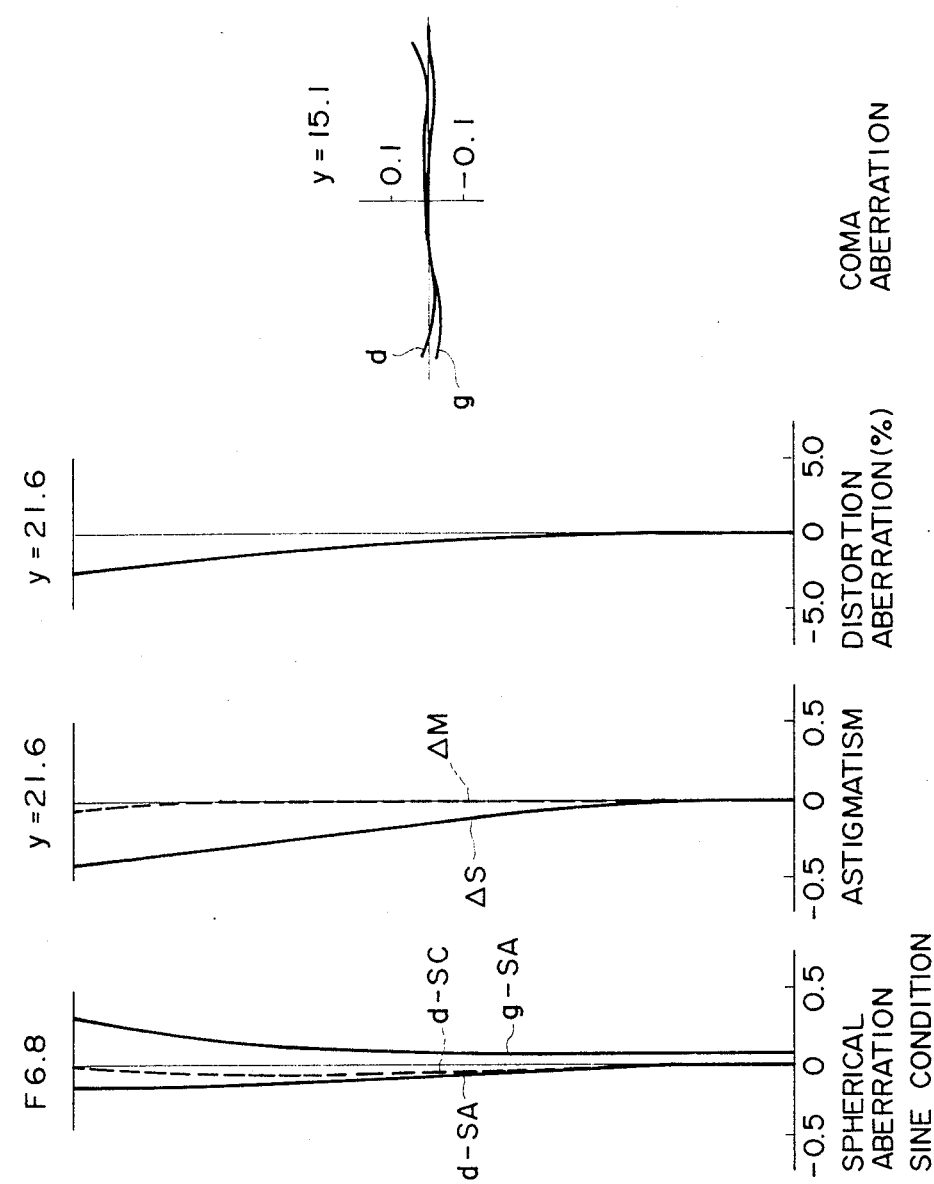
Figure 9C:
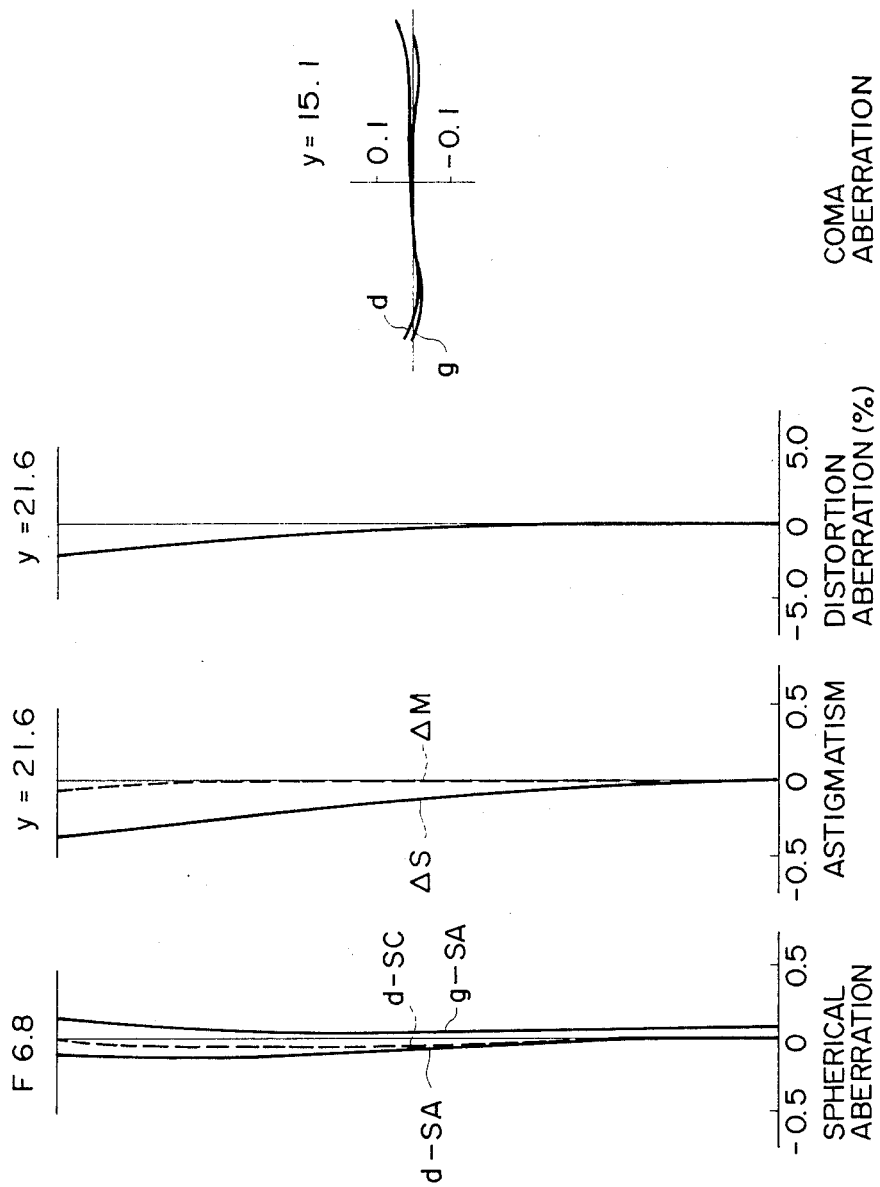
Figure 10B:
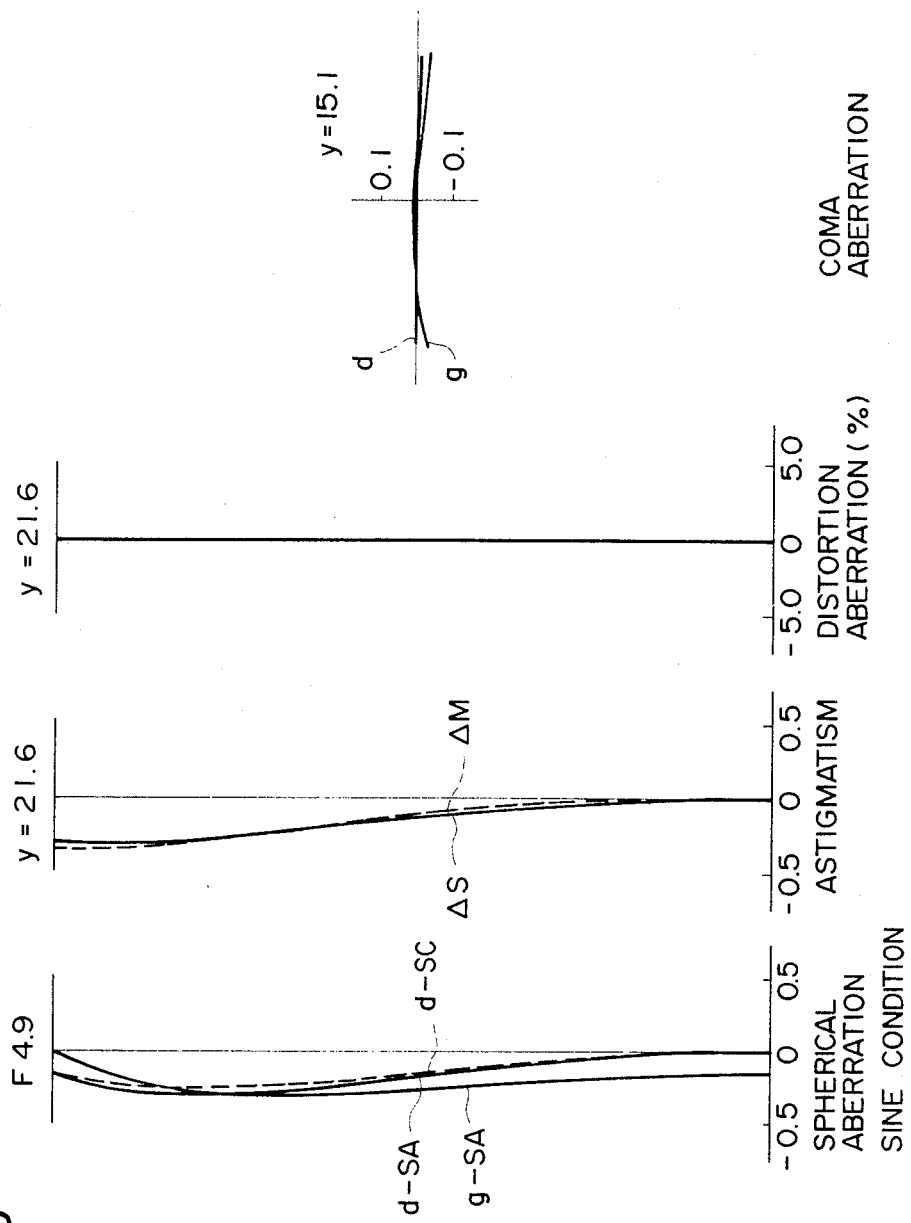
Figure 10C:
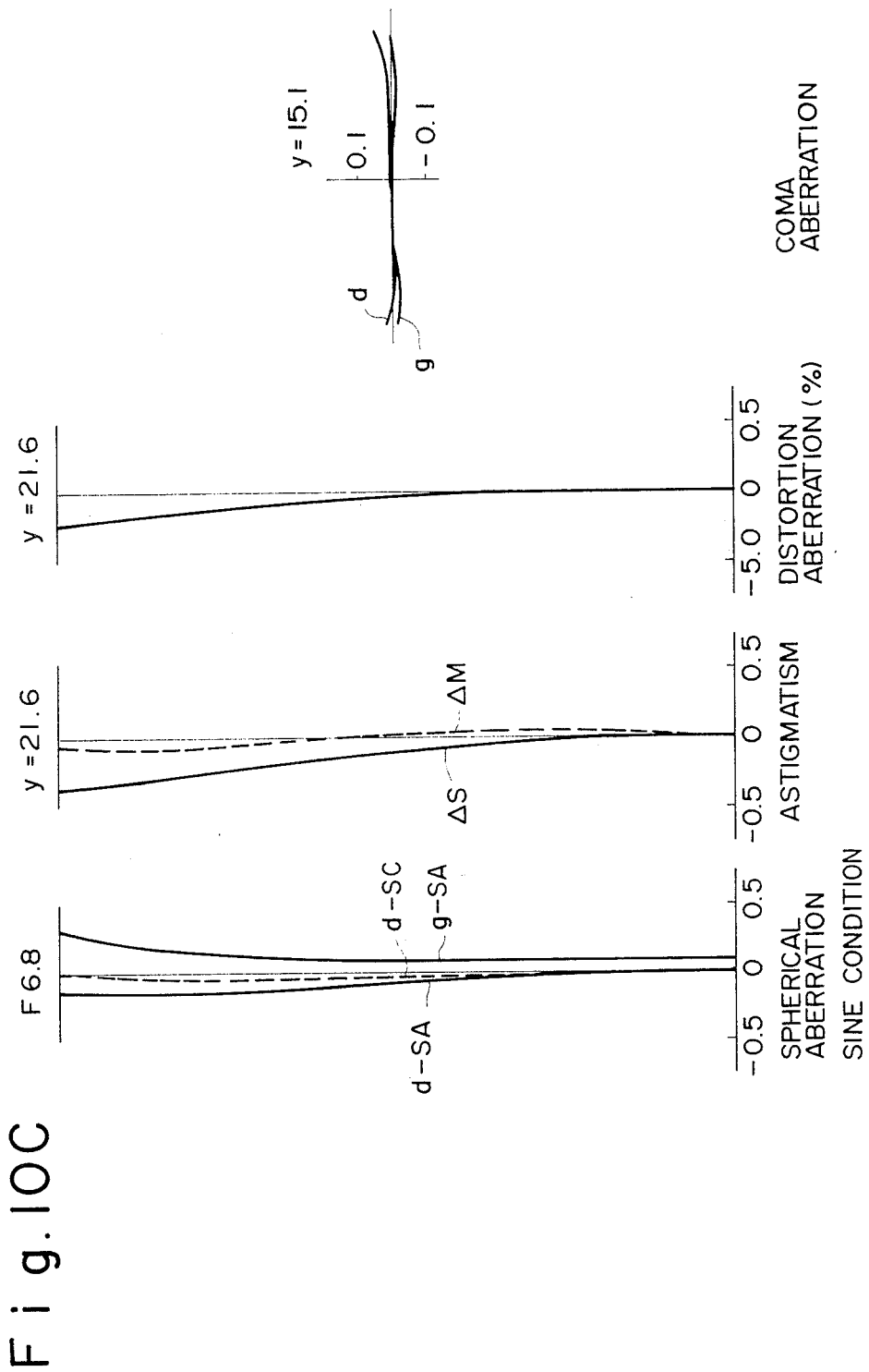
Figure 11A:
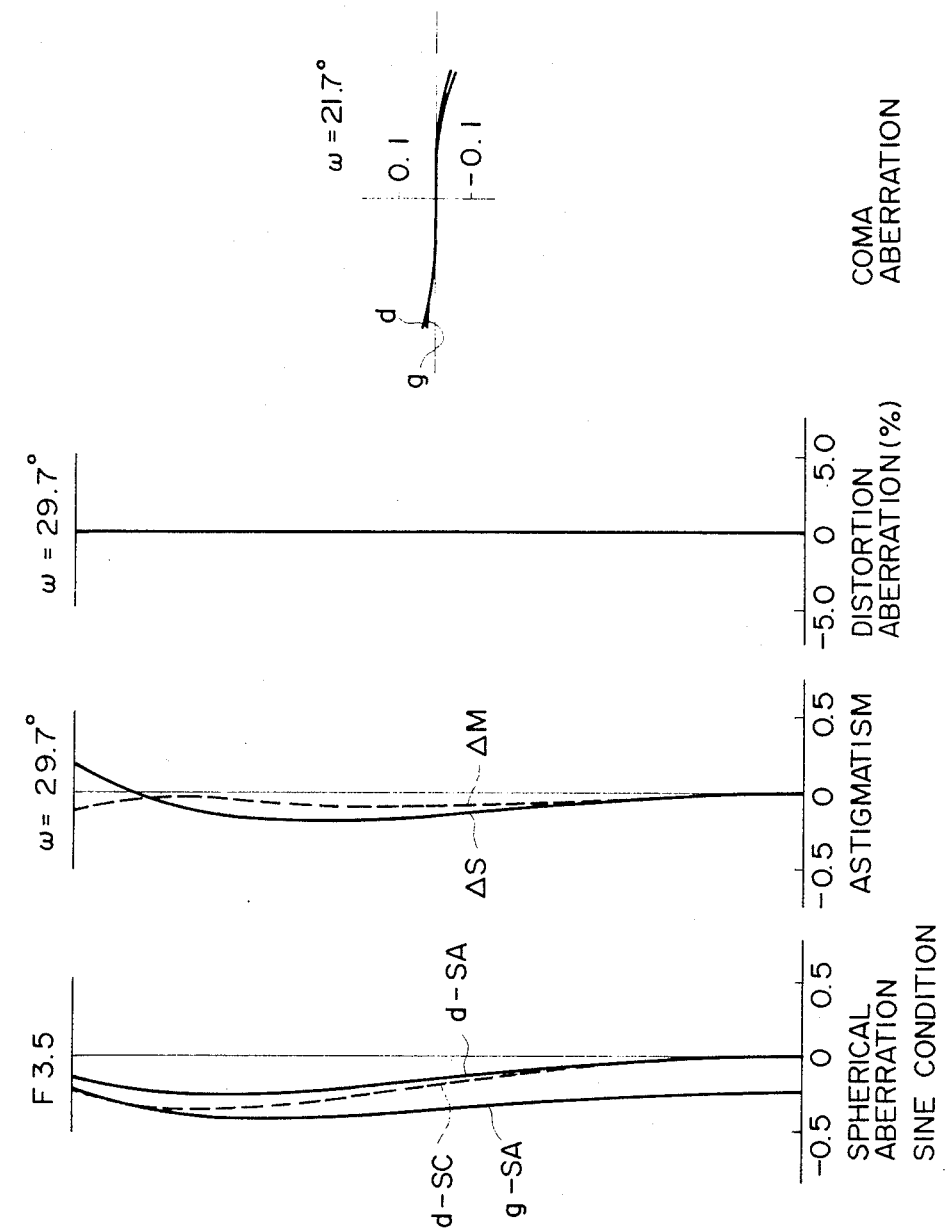
Figure 11B:
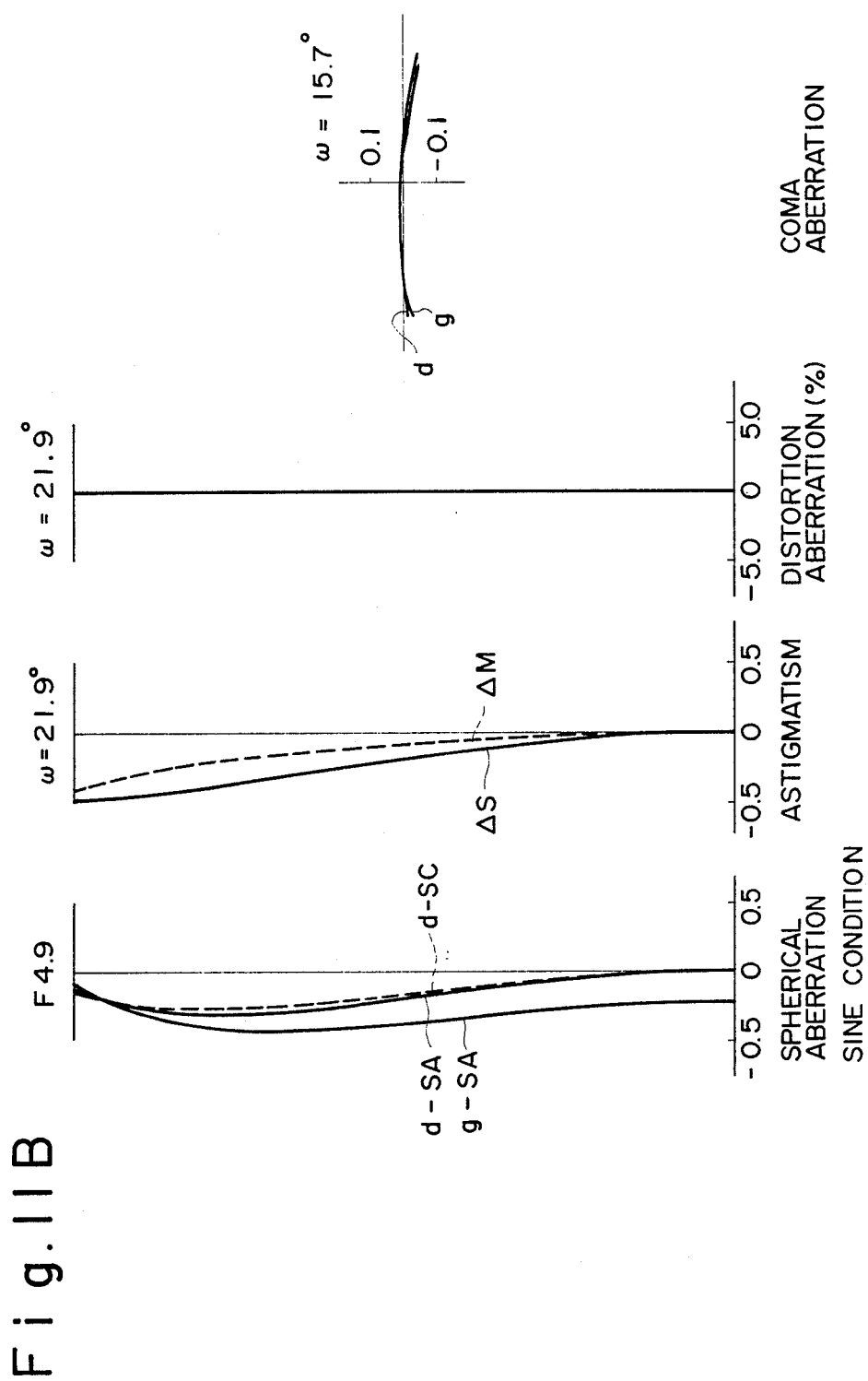
Figure 11C:
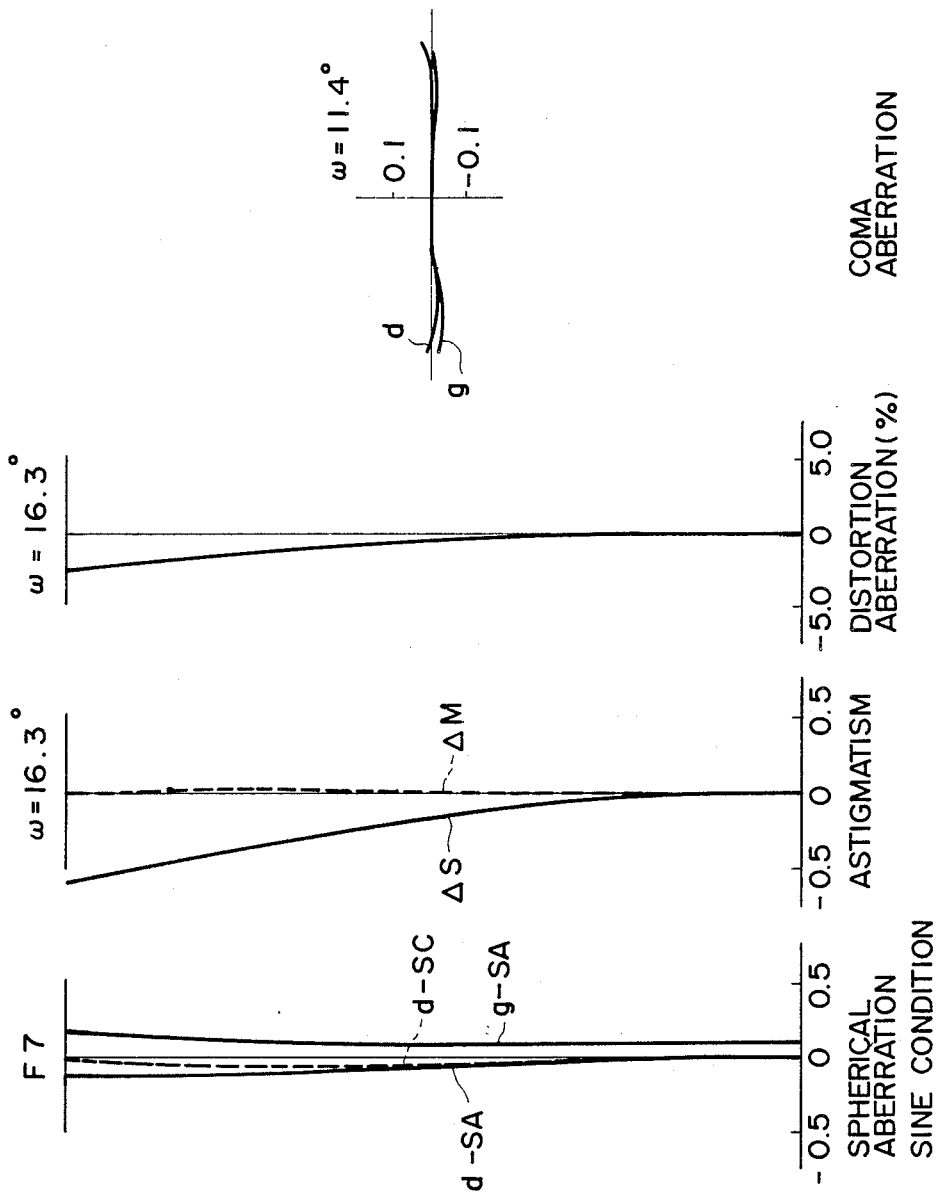
Figure 12:
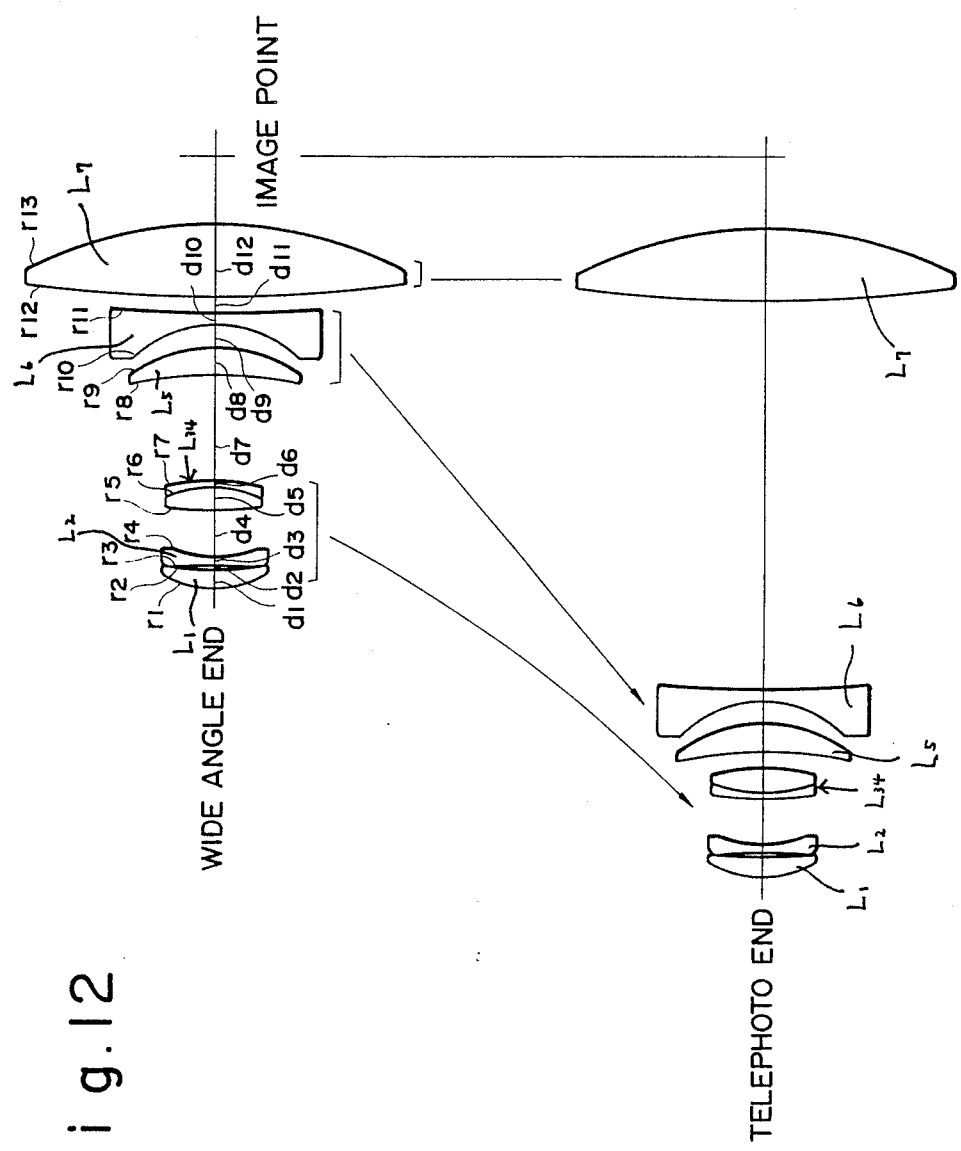
FIG. 12 is a schematic illustration showing a zoom lens system constructed in accordance with another embodiment of the present invention in which the wide angle mode is shown at top and the telephoto mode is shown at bottom.
Figure 13B:
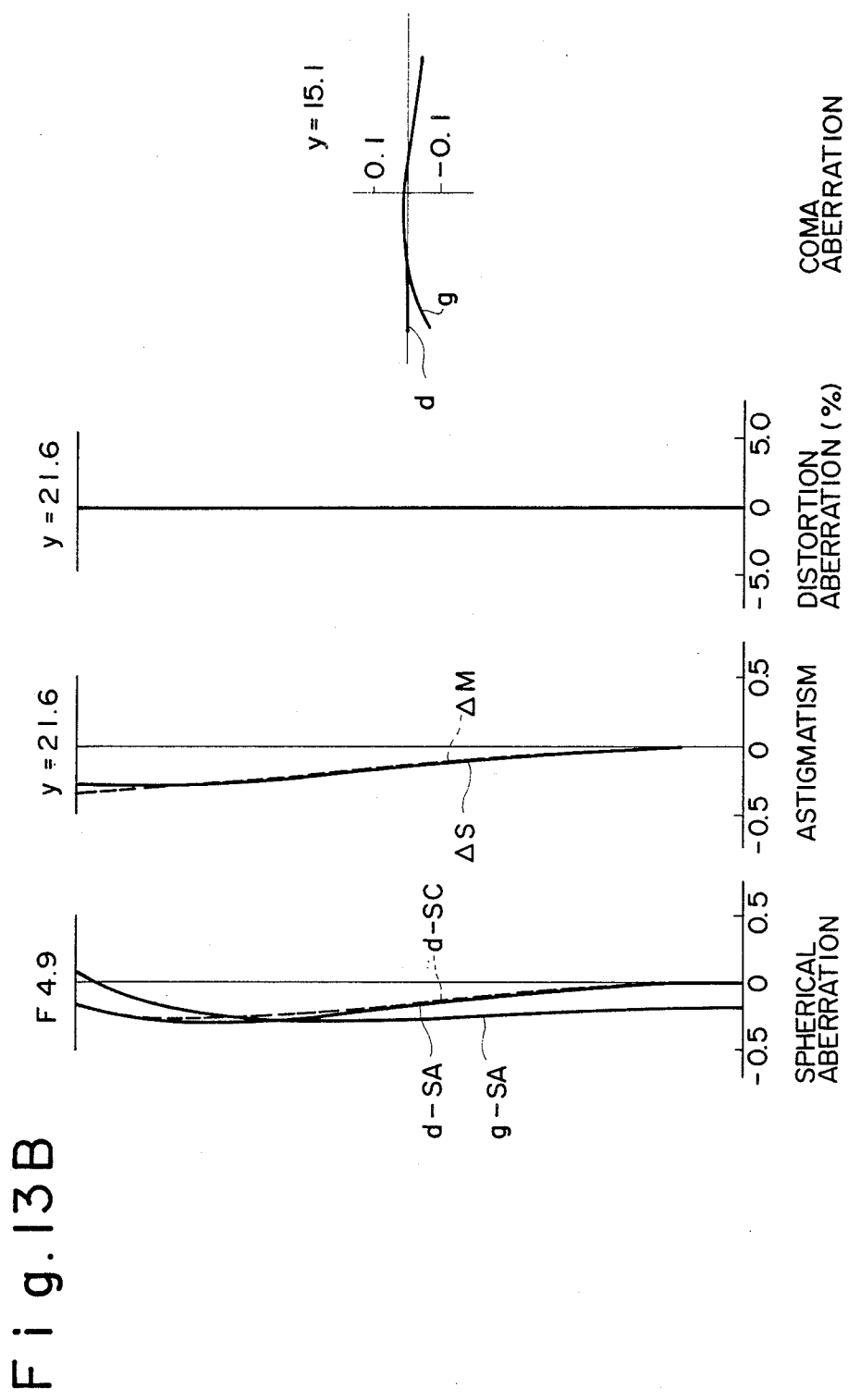
FIG. 13 shows graphs illustrating the aberration characteristics of Example 11 having the structure shown in FIG. 12, in each graph, A, B and C indicate wide angle end, intermediate focal distance and telephoto end, respectively.

In accordance with the principle of the present invention, there is provided an ultra compact zoom lens system which comprises a first lens unit having a positive refracting power, a second lens unit having a negative refracting power and a third lens unit having a positive refractive power arranged in the order mentioned from an object side to an image plane side. The paraxial lateral magnification $m_2$ of the second lens unit is always larger than unity, and the third lens unit is fixed in position relative to the first and second lens units. And, it is so structured that the focal distance of the overall system is varied by varying the distance between the first and second lens units and the distance between the second and third lens units relative to each other, which allows to provide a zoom lens system whose distance from the front surface of the front lens to an image point is extremely small. In addition, since the third lens unit is fixed in position, a zooming mechanism can be made simpler in structure and compact in size, as disclosed in the prior patent application mentioned above.

On the other hand, in a zoom lens system of this type, if it is desired to increase the zoom ratio, it is required to increase the refracting power of the second lens unit so as to reduce the amount of movement of the second lens unit associated with change of magnification. The above-described condition (1) is the condition to be satisfied for this purpose. In the case where an upper limit is exceeded and the refracting power of the second lens unit becomes smaller, if the zoom ratio is set at the order of 1.8, the distance between the second and third lens units at the wide angle end or the distance between the first and second lens units at the telephoto end becomes excessively small, which makes it difficult to construct a zoom lens system. In addition, the aberration produced by the first lens unit is opposite in sign to the aberration produced by the second lens unit so that they tend to cancel each other. However, if the refracting power of the second lens unit is made too strong to exceed the lower limit of the above-described condition (1), the balance of this aberration correction is lost, and, particularly, there is obtained a significant deterioration in performance at the wide angle end.

As described above, the first lens unit includes a front component and a rear component, wherein the front component is comprised of a positive lens $L_1$ and a negative lens $L_2$ and the rear component is comprised of a cemented lens $L_{34}$ having a positive refracting power. And, the cemented or compound lens $L_{34}$ is an integral combination between a positive lens and a negative lens or a negative lens and a positive lens. The second lens unit includes a positive lens $L_5$ and a negative lens $L_6$. And, the third lens unit includes a positive lens $L_7$. It is important not to increase the number of lenses unnecessarily so as to prevent the cost for manufacturing the present zoom lens system from being increased; however, a further attempt to reduce the number of lenses would rather cause a significant reduction in performance when the zoom ratio in the order of 1.8 is desired, which thus hinders to obtain an excellent zooming performance over the entire zooming range.

As an alternative, the rear component of the first lens unit may be comprised of a pair of separate negative and positive lenses instead of using a cemented lens, if desired. With this alternative structure, the degree of freedom in aberration correction is increased to allow to obtain a better performance at the expense of an increased complication in structure for holding two separate lenses movable. However, since this positive lens has a strong refracting power and thus tends to produce eccentricity, it is preferable to use a cemented lens for the rear component of the first lens unit from the view point of easiness in manufacture. The cemented lens $L_{34}$ must be disposed with the convex side of the contact surface being located at the object side if the negative and positive lenses are located in this order from the object side to the image plane side; on the other hand, the cemented lens $L_{34}$ must be so disposed with the convex side of the contact surface between the two lenses being located at the image plane side if the positive and negative lenses are located in the order mentioned from the object side to the image plane side. In addition, the cemented lens $L_{34}$ must satisfy the above-described conditions (2) and (3).

The above-described condition (2) is a condition for limiting the aberration produced by the cemented lens $L_{34}$. When the zoom ratio is set approximately at 1.8 or more, the positive refracting power of the cemented lens $L_{34}$ becomes stronger and thus the amount of aberration produced by the cemented lens $L_{34}$ increases. Accordingly, the production of aberration is prevented from occurring by increasing the refracting power of the positive lens of the cemented lens $L_{34}$. In addition, by setting the refractive index of the negative lens of the cemented lens $L_{34}$ larger than the refractive index of the associated positive lens, various aberrations produced by the cemented lens $L_{34}$ can be made smaller even more. With this structure, the correction of spherical aberration over the entire system is, in particular, made facilitated, and, furthermore, it is also advantageous for the correction of curvature of field at an intermediate focal distance.

The above-described condition (3) is a condition for reducing the color aberration produced at the cemented lens $L_{34}$. In particular, if its lower limit is exceeded, the axial color aberration tends to become too much under from the wide angle end to the intermediate focal distance.

In such a zoom lens system as in the present invention, when the zoom ratio is set at a large value, the color separation of coma aberration of the lower limit light ray becomes significantly large over the entire zoom range. The above-described condition (4) is a condition to limit such a color separation. Such a color separation of coma aberration tends to occur at the lenses $L_1$ and $L_2$ defining the front component of the first lens unit, and it is necessary to make the lens $L_1$ to be of low dispersion so as to prevent such a color separation from taking place.

In addition, if it is desired to increase the zoom ratio as set forth above, it is required to increase the refracting power of the second lens unit, which then causes the amount of aberration produced by the second lens unit to be increased. In order to cope with this situation, the refractive index of the lens $L_6$ is preferably set at a large value as given in the condition (6). If this lower limit is exceeded, the amount of aberration produced at the second lens unit increases, and, in particular, the curvature of field at the wide angle end becomes excessive and too difficult to correct. Accordingly, the condition (6) allows to appropriately correct various aberrations produced at the second lens unit and in particular to correct the spherical aberration at the telephoto end and the astigmatism at the wide angle end at the same time. If the refracting power of a refracting surface r9 becomes so weak to exceed the lower limit, the spherical aberration at the telephoto end becomes over-corrected, and, in particular, a meridional image plane at the wide angle end becomes over-corrected. On the contrary, if the upper limit is exceeded, an insufficient correction of spherical aberration results at the telephoto end and an insufficient correction of meridional image plane results at the wide angle end.

Now, specific examples of the lenses defining a zoom lens system of the present invention will now be described in detail below. In the table below, the following nomenclature is adopted.

F: focal distance of the entire system;
w: field angle;
r: paraxial radius of curvature;
d: spacing between lens surfaces;
n: refractive index against d line: and
$v_d$: Abe number.

In addition, parameters $K_i$, $A_i$, $B_i$, $C_i$ and $D_i$ indicate a constant of the cone and high order aspheric surface coefficients in the case where the aspheric surface at the ith surface is represented by the following equation.

$$Z = \frac{\frac{1}{r_i} y^2}{1 + \sqrt{1 - (1 + K_i)\frac{1}{r_i^2} y^2}} + A_i y^4 + B_i y^6 + C_i y^8 + D_i y^{10}$$

Here,
y: height from the optical axis; and
Z: distance from lens apex toward optical axis.

It should also be noted that, excepting Example 10, among the lens materials, those having the refractive index of 1.49154 or 1.491 used in the lens $L_7$ are acrylic resin materials. In addition, in Examples 1, 7, 8, 9 and 11, the finite design has been applied so as to obtain the best image forming characteristic with the rate of magnification approximately at $-1/50$.

Example 1
F = 39.1–73.7; $F_{No.}$ = 3.6–6.8;
Image height y = 21.6; Zoom ratio = X1.88

| Surface No. | r | d | n | $v_d$ |
|---|---|---|---|---|
| 1 | 14.301 | 2.1 | 1.8061 | 40.7 |
| 2 | 50.924 | 0.6 | | |
| 3 | −44.754 | 0.8 | 1.6 | 42.5 |
| 4 | 13.419 | 5.48 | | |
| 5 | 40.486 | 0.73 | 1.84666 | 23.8 |
| 6 | 17.922 | 2.76 | 1.7725 | 49.6 |
| 7 | −25.482 | variable | | |
| 8 | −54.277 | 3.35 | 1.60342 | 38.0 |
| 9 | −17.49 | 2.39 | | |
| 10 | −14.803 | 1.33 | 1.7725 | 49.6 |
| 11 | 133.466 | variable | | |
| 12 | 221.257 | 8.12 | 1.49154 | 57.8 |
| 13 | −45.107 | | | |

$K_{12} = -679.3816$; $A_{12} = 1.98982 \times 10^{-6}$;
$C_{12} = -1.24704 \times 10^{-9}$

| F | 39.1 | 53.7 | 73.7 |
|---|---|---|---|
| $d_7$ | 11.736 | 6.024 | 1.862 |
| $d_{11}$ | 1.809 | 19.195 | 43.057 |

Amount of telescope with magnification = $-1/50$

| F | 39.1 | 53.7 | 73.7 |
|---|---|---|---|
| delta $d_7$ | 0.445 | 0.324 | 0.236 |

Telephoto ratio (infinite) = 1.24–1.09

$|f_2| = 1.06 f_1$   $\left|\frac{(1-n_5)}{r_9} f_2\right| = 1.08$

Example 2
F = 39.1–73.7; $F_{No.}$ = 3.6–6.7;
2w = 57.9°–33.5°; Zoom ratio = 1.88

| Surface No. | r | d | n | $v_d$ |
|---|---|---|---|---|
| 1 | 13.714 | 2.37 | 1.7859 | 43.9 |
| 2 | 63.963 | 0.89 | | |
| 3 | −44.24 | 0.8 | 1.72 | 43.9 |
| 4 | 13.577 | 4.53 | | |
| 5 | 37.064 | 0.75 | 1.84666 | 23.8 |
| 6 | 16.879 | 2.83 | 1.7725 | 49.6 |
| 7 | −22.914 | variable | | |
| 8 | −40.236 | 3.4 | 1.60342 | 38.0 |
| 9 | −16.606 | 2.57 | | |
| 10 | −14.144 | 1.33 | 1.741 | 52.6 |
| 11 | 209.258 | variable | | |
| 12 | 228.227 | 7.78 | 1.491 | 61.4 |
| 13 | −46.913 | | | |

| F | 39.1 | 53.7 | 73.7 |
|---|---|---|---|
| $d_7$ | 11.483 | 5.793 | 1.644 |
| $d_{11}$ | 1.589 | 18.872 | 42.591 |

Telephoto ratio = 1.22–1.07

$|f_2| = 1.06 f_1$   $\left|\frac{(1-n_5)}{r_9} f_2\right| = 1.13$

Example 3
F = 39.1–73.7; $F_{No.}$ = 3.6–6.8;
2w = 57.9°–33.4°; Zoom ratio = 1.88

| Surface No. | r | d | n | $v_d$ |
|---|---|---|---|---|
| 1 | 13.005 | 2.35 | 1.6968 | 55.5 |
| 2 | 60.685 | 0.71 | | |
| 3 | −39.983 | 0.8 | 1.63854 | 55.5 |
| 4 | 13.107 | 4.41 | | |
| 5 | 36.565 | 0.75 | 1.84666 | 23.8 |
| 6 | 16.789 | 2.95 | 1.7725 | 49.6 |
| 7 | −23.625 | variable | | |
| 8 | −38.66 | 3.4 | 1.56732 | 42.8 |
| 9 | −16.388 | 2.755 | | |
| 10 | −13.975 | 1.33 | 1.713 | 53.9 |
| 11 | 208.072 | variable | | |
| 12 | 236.268 | 7.58 | 1.491 | 61.4 |
| 13 | −48.373 | | | |

| F | 39.1 | 53.7 | 73.7 |
|---|---|---|---|
| $d_7$ | 11.629 | 5.905 | 1.735 |
| $d_{11}$ | 1.650 | 18.837 | 42.425 |

Telephoto ratio = 1.22–1.07

$|f_2| = 1.06 f_1$   $\left|\frac{(1-n_5)}{r_9} f_2\right| = 1.08$

Example 4
F = 39.1–73.7; $F_{No.}$ = 3.6–6.8;
2w = 57.9°–33.4°; Zoom ratio = 1.88

| Surface No. | r | d | n | $v_d$ |
|---|---|---|---|---|
| 1 | 13.36 | 2.3 | 1.7859 | 43.9 |
| 2 | 63.655 | 0.61 | | |
| 3 | −50.081 | 0.8 | 1.72 | 43.9 |
| 4 | 13.301 | 4.88 | | |
| 5 | 38.717 | 0.75 | 1.84666 | 23.8 |
| 6 | 17.815 | 2.83 | 1.7725 | 49.6 |
| 7 | −23.767 | variable | | |
| 8 | −39.399 | 3.4 | 1.57501 | 41.5 |
| 9 | −16.519 | 2.745 | | |
| 10 | −14.025 | 1.33 | 1.713 | 53.9 |
| 11 | 182.063 | variable | | |
| 12 | 266.018 | 7.58 | 1.491 | 61.4 |
| 13 | −47.335 | | | |

| F | 39.1 | 53.7 | 73.7 |
|---|---|---|---|

-continued

| | | | |
|---|---|---|---|
| $d_7$ | 11.556 | 5.832 | 1.662 |
| $d_{11}$ | 1.594 | 18.781 | 42.369 |

Telephoto ratio = 1.22–1.07

$$|f_2| = 1.06\, f_1 \qquad \left|\frac{(1 - n_5)}{r_9} f_2\right| = 1.09$$

Example 5
F = 39.1–73.7; $F_{No.}$ = 3.6–6.8;
2w = 57.9°–33.7°; Zoom ratio = 1.88

| Surface No. | r | d | n | $v_d$ |
|---|---|---|---|---|
| 1 | 13.983 | 2.3 | 1.834 | 37.3 |
| 2 | 62.696 | 0.71 | | |
| 3 | −50.096 | 0.8 | 1.72342 | 38.0 |
| 4 | 13.43 | 5.2 | | |
| 5 | 41.101 | 0.75 | 1.84666 | 23.8 |
| 6 | 18.045 | 2.87 | 1.7725 | 49.6 |
| 7 | −23.237 | variable | | |
| 8 | −47.178 | 3.65 | 1.5927 | 35.5 |
| 9 | −17.036 | 2.46 | | |
| 10 | −14.701 | 1.35 | 1.7725 | 49.6 |
| 11 | 223.902 | variable | | |
| 12 | 5102.044 | 7.3 | 1.491 | 61.4 |
| 13 | −42.558 | | | |

| F | 39.1 | 53.7 | 73.7 |
|---|---|---|---|
| $d_7$ | 12.003 | 5.991 | 1.611 |
| $d_{11}$ | 1.973 | 19.185 | 42.807 |

Telephoto ratio = 1.23–1.07

$$|f_2| = 1.06\, f_1 \qquad \left|\frac{(1 - n_5)}{r_9} f_2\right| = 1.11$$

Example 6
F = 39.1–73.7; $F_{No.}$ = 3.6–6.8;
2w = 57.9°–33.3°; Zoom ratio = 1.88

| Surface No. | r | d | n | $v_d$ |
|---|---|---|---|---|
| 1 | 13.991 | 2.23 | 1.834 | 37.3 |
| 2 | 69.251 | 0.48 | | |
| 3 | −50.835 | 0.8 | 1.72342 | 38.0 |
| 4 | 13.661 | 5.24 | | |
| 5 | 42.727 | 0.75 | 1.84666 | 23.8 |
| 6 | 19.008 | 2.76 | 1.7725 | 49.6 |
| 7 | −23.801 | variable | | |
| 8 | −42.784 | 3.3 | 1.62004 | 36.3 |
| 9 | −17.477 | 2.71 | | |
| 10 | −14.747 | 1.34 | 1.7725 | 49.6 |
| 11 | 219.341 | variable | | |
| 12 | 246.131 | 7.17 | 1.491 | 61.4 |
| 13 | −50.481 | | | |

$K_{12} = -682.051$; $A_{12} = 1.86415 \times 10^{-7}$;
$B_{12} = 1.61341 \times 10^{-8}$; $C_{12} = -4.35254 \times 10^{-11}$;
$D_{12} = 3.83476 \times 10^{-14}$.

| F | 39.1 | 53.7 | 73.7 |
|---|---|---|---|
| $d_7$ | 11.651 | 5.983 | 1.854 |
| $d_{11}$ | 1.697 | 18.833 | 42.349 |

Telephoto ratio = 1.22–1.07

$$|f_2| = 1.058\, f_1 \qquad \left|\frac{(1 - n_5)}{r_9} f_2\right| = 1.1$$

Example 7
F = 39.1–73.7; $F_{No.}$ = 3.6–6.8;
y = 21.6; Zoom ratio = 1.88

| Surface No. | r | d | n | $v_d$ |
|---|---|---|---|---|
| 1 | 13.639 | 2.07 | 1.8061 | 40.7 |
| 2 | 42.302 | 0.74 | | |
| 3 | −46.651 | 0.8 | 1.6 | 42.5 |
| 4 | 12.988 | 4.98 | | |
| 5 | 37.225 | 0.75 | 1.84666 | 23.8 |
| 6 | 16.578 | 2.88 | 1.7725 | 49.6 |
| 7 | −25.732 | variable | | |
| 8 | −52.485 | 3.38 | 1.5927 | 35.5 |
| 9 | −16.856 | 2.346 | | |
| 10 | −14.37 | 1.33 | 1.7725 | 49.6 |
| 11 | 162.724 | variable | | |
| 12 | 213.51 | 8.1 | 1.491 | 61.4 |
| 13 | −46.158 | | | |

| F | 39.1 | 53.7 | 73.7 |
|---|---|---|---|
| $d_7$ | 11.534 | 5.795 | 1.614 |
| $d_{11}$ | 1.875 | 19.182 | 42.934 |

Amount of telescope with magnification = −1/50

| F | 39.1 | 53.7 | 73.7 |
|---|---|---|---|
| delta $d_7$ | 0.445 | 0.324 | 0.236 |

Telephoto ratio (infinite) = 1.23–1.07

$$|f_2| = 1.06\, f_1 \qquad \left|\frac{(1 - n_5)}{r_9} f_2\right| = 1.1$$

Example 8
F = 39.1–73.7; $F_{No.}$ = 3.6–6.8;
y = 21.6; Zoom ratio = 1.88

| Surface No. | r | d | n | $v_d$ |
|---|---|---|---|---|
| 1 | 13.484 | 2.03 | 1.8061 | 40.7 |
| 2 | 42.276 | 0.59 | | |
| 3 | −51.325 | 0.8 | 1.6 | 42.5 |
| 4 | 12.942 | 5.18 | | |
| 5 | 37.296 | 0.75 | 1.84666 | 23.8 |
| 6 | 16.65 | 2.8 | 1.7725 | 49.6 |
| 7 | −27.025 | variable | | |
| 8 | −46.663 | 3.05 | 1.72825 | 28.3 |
| 9 | −18.018 | 2.4 | | |
| 10 | −14.689 | 1.33 | 1.8061 | 40.7 |
| 11 | 170.862 | variable | | |
| 12 | 171.801 | 8.08 | 1.491 | 61.4 |
| 13 | −48.601 | | | |

| F | 39.1 | 53.7 | 73.7 |
|---|---|---|---|
| $d_7$ | 11.704 | 5.959 | 1.773 |
| $d_{11}$ | 1.739 | 19.248 | 43.278 |

Amount of telescope with magnification = −1/50

| F | 39.1 | 53.7 | 73.7 |
|---|---|---|---|
| delta $d_7$ | 0.448 | 0.326 | 0.238 |

Telephoto ratio (infinite) = 1.23–1.08

$$|f_2| = 1.07\, f_1 \qquad \left|\frac{(1 - n_5)}{r_9} f_2\right| = 1.28$$

Example 9
F = 39.1–73.7; $F_{No.}$ = 3.6–6.8;
y = 21.6; Zoom ratio = 1.88

| Surface No. | r | d | n | $v_d$ |
|---|---|---|---|---|
| 1 | 14.071 | 2.03 | 1.8061 | 40.7 |
| 2 | 49.5 | 0.6 | | |
| 3 | −47.749 | 0.8 | 1.6 | 42.5 |
| 4 | 13.21 | 5.62 | | |
| 5 | 40.11 | 0.75 | 1.84666 | 23.8 |
| 6 | 17.537 | 2.78 | 1.7725 | 49.6 |
| 7 | −26.007 | variable | | |
| 8 | −51.664 | 3.35 | 1.62004 | 36.3 |
| 9 | −17.76 | 2.5 | | |
| 10 | −14.873 | 1.33 | 1.7725 | 49.6 |
| 11 | 137.758 | variable | | |
| 12 | 252.847 | 8.08 | 1.491 | 61.4 |
| 13 | −44.727 | | | |

$K_{12} = -704.8483$; $A_{12} = 1.71158 \times 10^{-6}$;
$C_{12} = -1.33957 \times 10^{-9}$.

| F | 39.1 | 53.7 | 73.7 |
|---|---|---|---|
| $d_7$ | 11.668 | 5.929 | 1.748 |
| $d_{11}$ | 1.779 | 19.086 | 42.839 |

Amount of telescope with magnification = −1/50

| F | 39.1 | 53.7 | 73.7 |
|---|---|---|---|
| delta $d_7$ | 0.445 | 0.324 | 0.236 |

-continued

Telephoto ratio (infinite) = 1.24–1.08

$$|f_2| = 1.06 f_1 \quad \left|\frac{(1-n_5)}{r_9} f_2\right| = 1.09$$

Example 10
F = 38–76; $F_{No.}$ = 3.5–7;
2w = 59.4°–32.6°; Zoom ratio = 2

| Surface No. | r | d | n | $v_d$ |
|---|---|---|---|---|
| 1 | 13.124 | 2.15 | 1.788 | 47.5 |
| 2 | 44.214 | 0.66 | | |
| 3 | −54.337 | 0.8 | 1.64328 | 47.9 |
| 4 | 12.657 | 5.04 | | |
| 5 | 34.314 | 0.75 | 1.84666 | 23.8 |
| 6 | 18.546 | 2.7 | 1.741 | 52.6 |
| 7 | −25.026 | variable | | |
| 8 | −58.524 | 3.85 | 1.58144 | 40.9 |
| 9 | −16.432 | 2.13 | | |
| 10 | −14.162 | 1.27 | 1.7725 | 49.6 |
| 11 | 151.442 | variable | | |
| 12 | 326.512 | 6.68 | 1.62041 | 60.3 |
| 13 | −52.396 | | | |

| F | 39.1 | 53.7 | 73.7 |
|---|---|---|---|
| $d_7$ | 12.468 | 6.01 | 1.444 |
| $d_{11}$ | 1.087 | 19.965 | 46.622 |

Telephoto ratio = 1.25–1.08

$$|f_2| = 1.06 f_1 \quad \left|\frac{(1-n_5)}{r_9} f_2\right| = 1.12$$

Example 11
F = 39.1–73.7; $F_{No.}$ = 3.6–6.8;
y = 21.6; Zoom ratio = 1.88

| Surface No. | r | d | n | $v_d$ |
|---|---|---|---|---|
| 1 | 13.382 | 2.03 | 1.8061 | 40.7 |
| 2 | 41.925 | 0.6 | | |
| 3 | −54.444 | 0.8 | 1.58144 | 40.9 |
| 4 | 12.619 | 5.31 | | |
| 5 | 42.655 | 2.61 | 1.7725 | 49.6 |
| 6 | −14.377 | 0.75 | 1.84666 | 23.8 |
| 7 | −25.981 | variable | | |
| 8 | −46.768 | 3.1 | 1.72825 | 28.3 |
| 9 | −17.868 | 2.355 | | |
| 10 | −14.581 | 1.33 | 1.8061 | 40.7 |
| 11 | 172.015 | variable | | |
| 12 | 167.694 | 8.05 | 1.491 | 61.4 |
| 13 | −48.93 | | | |

| F | 39.1 | 53.7 | 73.7 |
|---|---|---|---|
| $d_7$ | 11.539 | 5.795 | 1.608 |
| $d_{11}$ | 1.763 | 19.272 | 43.302 |

Amount of telescope with magnification = −1/50

| F | 39.1 | 53.7 | 73.7 |
|---|---|---|---|
| delta $d_7$ | 0.448 | 0.326 | 0.238 |

Telephoto ratio (infinite) = 1.22–1.08

$$|f_2| = 1.066 f_1 \quad \left|\frac{(1-n_5)}{r_9} f_2\right| = 1.29$$

As described above, in accordance with the present invention, there is provided a zoom lens system which is relatively simple in structure, extremely compact in size with the telephoto ratio ranging from 1.2 to 1.07, large in zoom ratio and corrected in various aberrations over the entire zoom range. In addition, if the third lens unit is comprised of a plastic lens, it will significantly contribute to reduction of cost as well as in weight. Since the third lens unit is provided fixed in position, the entire structure is simplified and thus it allows to make the camera body compact in size when mounted on a camera.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A zoom lens system, comprising:
   a first lens unit having a positive refracting power, said first lens unit including a positive lens $L_1$, a negative lens $L_2$ and a cemented lens $L_{34}$ comprised of a negative lens and a positive lens and having a positive resultant refracting power;
   a second lens unit having a negative refracting power, said second lens unit including a positive lens $L_5$ and a negative lens $L_6$; and
   a third lens unit having a positive refracting power and including a positive lens $L_7$;
   whereby, with the designation of following parameters,
   $f_1$, $f_2$: resultant focal distances of said and second lens units, respectively;
   $n_6$: refractive index of a lens material of said negative lens $L_6$;
   $v_1$: dispersion of a lens material of said positive lens $L_1$;
   $n_+$, $n_-$: refractive indexes of materials of the positive and negative lenses of said cemented lens $L_{34}$, respectively; and
   $v_+$, $v_-$: dispersions of the materials of the positive and negative lenses of said cemented lens $L_{34}$, respectively;
   the following conditions are satisfied:
   (1) $1.0 f_1 < f_2 < 1.2 f_1$;
   (2) $1.68 < n_+ < n_-$;
   (3) $20 < v_+ - v_-$;
   (4) $35 < v_1$; and
   (5) $1.65 < n_6$.

2. The zoom lens system of claim 1, wherein said second lens unit has a paraxial lateral magnification which is always larger than unity.

3. The zoom lens system of claim 1, wherein said third lens unit is fixed in position with respect to said first and second lens units.

4. The zoom lens system of claim 3, wherein a focal distance of said system is varied by varying a spacing between said first and second lens units and a spacing between said second and third lens units relative to each other.

5. The zoom lens system of claim 1, wherein said first, second and third lens units are arranged coaxially along a common optical axis in the order mentioned from an object side to an image plane side.

6. The zoom lens system of claim 5, wherein designating a radius of curvature of a surface of said positive lens $L_5$ at the object side by $r_9$ and a refractive index of a lens material of said positive lens $L_5$ by $n_5$, the following additional condition is satisfied:

$$0.8 < \left|\frac{(1-n_5)}{r_9} f_2\right| < 1.6 \quad (6)$$

* * * * *